(12) United States Patent
Klingensmith

(10) Patent No.: US 12,564,955 B2
(45) Date of Patent: Mar. 3, 2026

(54) MODELING ROBOT SELF-OCCLUSION FOR LOCALIZATION

(71) Applicant: Boston Dynamics, Inc., Waltham, MA (US)

(72) Inventor: Matthew Klingensmith, Somerville, MA (US)

(73) Assignee: Boston Dynamics, Inc., Waltham, MA (US)

( * ) Notice: Subject to any disclaimer, the term of this patent is extended or adjusted under 35 U.S.C. 154(b) by 161 days.

(21) Appl. No.: 18/335,534

(22) Filed: Jun. 15, 2023

(65) Prior Publication Data

US 2023/0415342 A1      Dec. 28, 2023

Related U.S. Application Data

(60) Provisional application No. 63/354,764, filed on Jun. 23, 2022.

(51) Int. Cl.
| | |
|---|---|
| *G05D 1/00* | (2024.01) |
| *B25J 9/16* | (2006.01) |

(Continued)

(52) U.S. Cl.
CPC .......... *B25J 9/1664* (2013.01); *B25J 19/021* (2013.01); *G01S 17/89* (2013.01)

(58) Field of Classification Search
CPC ....... B25J 9/1664; B25J 19/021; G01S 17/89; G01S 7/4808; G01S 17/931; G05D 1/243;

(Continued)

(56) References Cited

U.S. PATENT DOCUMENTS

| | | |
|---|---|---|
| 8,401,783 B2 | 3/2013 | Hyung et al. |
| 9,534,899 B2 | 1/2017 | Gutmann et al. |

(Continued)

FOREIGN PATENT DOCUMENTS

| | | |
|---|---|---|
| CN | 116830061 | 9/2023 |
| EP | 4285199 A1 | 12/2023 |

(Continued)

OTHER PUBLICATIONS

Besl, A Method for Registration of 3-D Shapes, IEEE Transaction on Pattern Analysis and Machine Intelligence, vol. 14, No. 2, Feb. 1992, pp. 239-256, https://graphics.stanford.edu/courses/cs164-09-spring/Handouts/paper_icp.pdf.

(Continued)

*Primary Examiner* — Masud Ahmed
(74) *Attorney, Agent, or Firm* — Knobbe, Martens, Olson & Bear, LLP

(57)      ABSTRACT

Methods and apparatus for localizing a robot in an environment are provided. The method comprises determining, for a first configuration of the robot at a first time, first sensor data that is not occluded by a portion of the robot, determining, for a second configuration of the robot at a second time, second sensor data that is not occluded by a portion of the robot, determining first overlapping data corresponding to second sensor data that overlaps the first sensor data when the robot is in the first configuration, and localizing the robot in the environment based on the first overlapping data and the second overlapping data.

21 Claims, 11 Drawing Sheets

(51) Int. Cl.
   *B25J 19/02* (2006.01)
   *G01S 17/89* (2020.01)
(58) Field of Classification Search
   CPC ........................ G05D 1/246; G05D 2111/10;
   G05D 2111/65; G05D 1/2247; G05D
   2109/12; B62D 57/032
   See application file for complete search history.

(56) References Cited

U.S. PATENT DOCUMENTS

| | | | |
|---|---|---|---|
| 9,574,883 B2 | 2/2017 | Watts et al. | |
| 9,844,879 B1 | 12/2017 | Cousins et al. | |
| 9,969,086 B1 | 5/2018 | Whitman | |
| 10,639,794 B2 | 5/2020 | Cousins et al. | |
| 11,153,503 B1* | 10/2021 | Ebrahimi Afrouzi .. | H04N 7/183 |
| 11,274,929 B1* | 3/2022 | Afrouzi .................... | G06T 7/30 |
| 11,597,104 B2* | 3/2023 | Rembisz ................ | B25J 19/022 |
| 12,179,337 B2 | 12/2024 | Gillett | |
| 12,321,178 B2 | 6/2025 | da Silva et al. | |
| 2012/0197464 A1 | 8/2012 | Wang et al. | |
| 2013/0002822 A1 | 1/2013 | Yu et al. | |
| 2016/0089791 A1* | 3/2016 | Bradski .................. | B25J 9/1671 |
| | | | 700/214 |
| 2018/0161986 A1 | 6/2018 | Kee et al. | |
| 2018/0328737 A1 | 11/2018 | Frey et al. | |
| 2018/0348742 A1 | 12/2018 | Byme et al. | |
| 2019/0033459 A1 | 1/2019 | Tisdale et al. | |
| 2019/0332114 A1 | 10/2019 | Moroniti et al. | |
| 2019/0355173 A1 | 11/2019 | Gao | |
| 2020/0103914 A1* | 4/2020 | Holz .................. | G01C 21/3602 |
| 2020/0109954 A1 | 4/2020 | Li et al. | |
| 2020/0132472 A1 | 4/2020 | Mittal et al. | |
| 2020/0174460 A1 | 6/2020 | Byme et al. | |
| 2020/0258400 A1 | 8/2020 | Yuan et al. | |
| 2020/0300635 A1* | 9/2020 | Holz ....................... | G01S 17/87 |
| 2020/0386882 A1 | 12/2020 | Klein et al. | |
| 2021/0138659 A1 | 5/2021 | Arora et al. | |
| 2021/0180961 A1 | 6/2021 | Oh | |
| 2021/0191401 A1* | 6/2021 | Sinyavskiy ............ | G05D 1/027 |
| 2021/0283783 A1 | 9/2021 | Gillett | |
| 2021/0331313 A1* | 10/2021 | Klingensmith ........ | B25J 13/006 |
| 2022/0063662 A1 | 3/2022 | Sprunk et al. | |
| 2022/0382287 A1 | 12/2022 | Van De Velde et al. | |
| 2023/0215092 A1 | 7/2023 | Kim et al. | |
| 2023/0286161 A1* | 9/2023 | Dellon .................. | B25J 9/1653 |
| 2023/0333254 A1* | 10/2023 | Perlowski .............. | G01S 17/931 |
| 2024/0077882 A1 | 3/2024 | Degirmenci et al. | |
| 2024/0192695 A1 | 6/2024 | Klingensmith et al. | |

FOREIGN PATENT DOCUMENTS

| | | |
|---|---|---|
| KR | 10-2023-0137334 | 10/2023 |
| WO | WO 2022/164832 A1 | 8/2022 |

OTHER PUBLICATIONS

Newcombe et al., "Kinect Fusion:Real-Time Dense Surface Mapping and Tracking", 2011, 10 pages, https://www.microsoft.com/en-us/research/wp-content/uploads/2016/02/ismar2011.

Schmidt et al., DART: Dense Articulated Real-Time Tracking, University of Washington, Computer Science & Engineering, Seattle, Washington, Robotics: Science and Systems (RSS), 2014, 9 pages, http://www.roboticsproceedings.org/rss10/p30.pdf.

"Anybotics Introduces End-to-End Robotic Inspection Solution," video screen shots taken from https://www.youtube.com/watch?v=g3odef0EAFA, Apr. 21, 2021, downloaded Apr. 3, 2025, 16 pages.

"ANYmal Robots Inspecting Petronas' Offshore Platform (Webinar)," video screen shots taken from https://www.youtube.com/watch?v=aymdpFsdgbA, Jan. 22, 2021, downloaded Apr. 9, 2025, 19 pages.

"ANYmal X—Robotic Inspection in Ex-Rated Zones," video screen shots taken from https://vimeo.com/744482989, Aug. 30, 2022, downloaded Apr. 9, 2025, 13 pages.

"ANYmal @ ERL Emergency Robotics 2017," video screen shots taken from https://www.youtube.com/watch?v=qrJIMze_xhQ, Oct. 2, 2017, downloaded Apr. 9, 2025, 4 pages.

Anonymous, "Anybotics Introduces End-to-End Robotic Inspection Solution," https://www.anybotics.com/news/anybotics-introduces-end-to-end-robotic-inspection-solution/, Apr. 21, 2021, printed Apr. 9, 2025, 11 pages.

Anonymous, "Guide to Industrial Inspection Robots: Identifying the Task you Want to Automate," https://www.anybotics.com/news/how-to-hire-an-industrial-inspection-robot-part-1/, Mar. 21, 2023, printed Apr. 9, 2025, 15 pages.

Anonymous, "Anybotics, Cognite & Accenture Enable Real End-to-End Robotic Inspection Solutions," https://www.anybotics.com/news/anybotics-cognite-accenture-enable-real-end-to-end-robotic-inspection-solutions/, May 30, 2022, printed Apr. 9, 2025, 13 pages.

Lee et al. "A New Semantic Descriptor for Data Association in Semantic SLAM", 2019 109th International Conference on Control, Automation and Systems (ICCAS), Jeju, Korea (South), 2019, pp. 1178-1181, doi: 10.23919/ICCAS47443.2019.8971639.

Mendes et al., "ICP-Based Pose-Graph SLAM," International Symposium on Safety, Security, and Rescue Robotics (SSRR), Oct. 2016, pp. 195-200, https://hal.archives-ouvertes.fr/hal-01522248/document.

Mendes et al., "SeDAR—Semantic Detection and Ranging: Humans can localise without LiDAR, can robots?," 2018 IEEE International Conference on Robotics and Automation (ICRA), Brisbane, QLD, Australia, 2018, pp. 6053-6060, doi: 10.1109/ICRA.2018.8461074 (Year: 2018).

International Search Report and Written Opinion, PCT/US2022/013777, May 6, 2022, 11 pages.

* cited by examiner

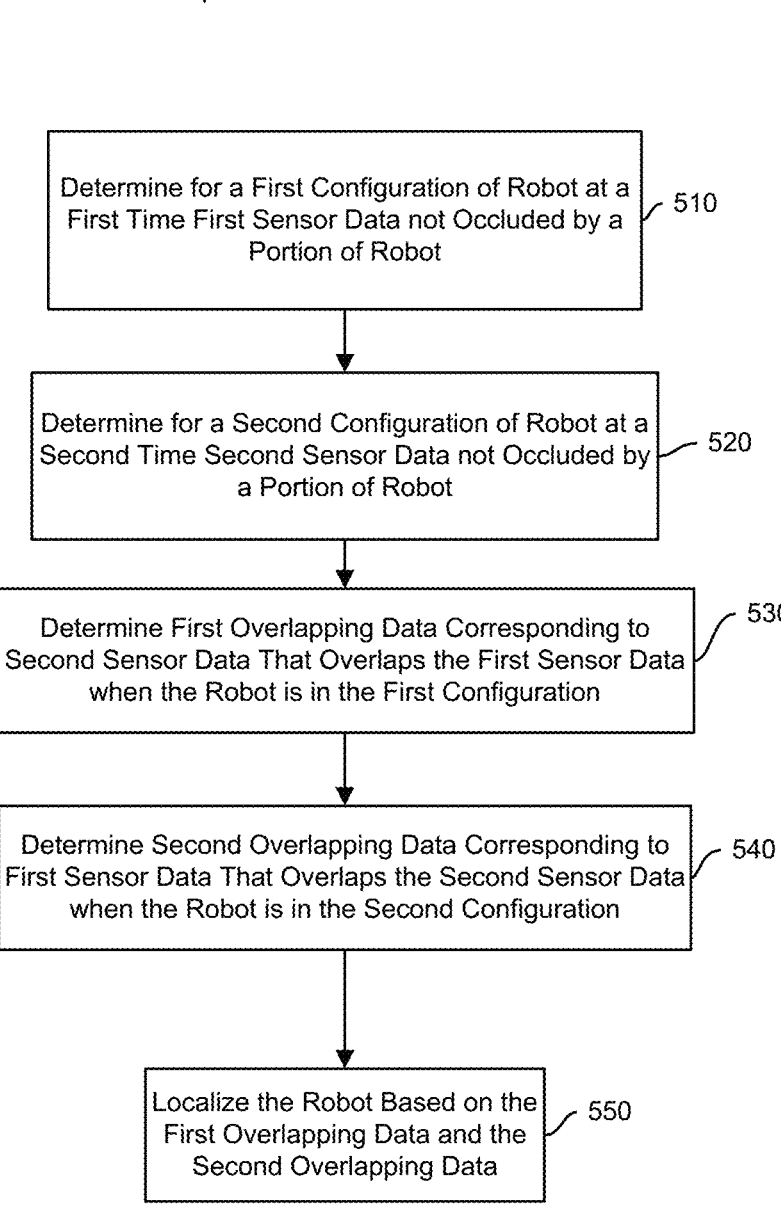

500

Determine for a First Configuration of Robot at a First Time First Sensor Data not Occluded by a Portion of Robot — 510

Determine for a Second Configuration of Robot at a Second Time Second Sensor Data not Occluded by a Portion of Robot — 520

Determine First Overlapping Data Corresponding to Second Sensor Data That Overlaps the First Sensor Data when the Robot is in the First Configuration — 530

Determine Second Overlapping Data Corresponding to First Sensor Data That Overlaps the Second Sensor Data when the Robot is in the Second Configuration — 540

Localize the Robot Based on the First Overlapping Data and the Second Overlapping Data — 550

FIG. 5

MODELING ROBOT SELF-OCCLUSION FOR LOCALIZATION

RELATED APPLICATIONS

This application claims the benefit under 35 U.S.C. § 119(e) of U.S. Provisional Patent Application Ser. No. 63/354,764, filed Jun. 23, 2022, and entitled, "MODELING ROBOT SELF-OCCLUSION FOR LOCAL-IZATION," the entire contents of which is incorporated herein by reference.

BACKGROUND

A robot is generally a reprogrammable and multifunc-tional manipulator, often designed to move material, parts, tools, or specialized devices through variable programmed motions for performance of tasks. Robots may be manipu-lators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transporta-tion, hazardous environments, exploration, and healthcare.

SUMMARY

In some embodiments, a method for localizing a robot in an environment is provided. The method comprises deter-mining, for a first configuration of the robot at a first time, first sensor data that is not occluded by a portion of the robot, determining, for a second configuration of the robot at a second time, second sensor data that is not occluded by a portion of the robot, determining first overlapping data corresponding to second sensor data that overlaps the first sensor data when the robot is in the first configuration, and localizing the robot in the environment based on the first overlapping data and the second overlapping data.

In one aspect, the method further comprises determining second overlapping data corresponding to first sensor data that overlaps the second sensor data when the robot is in the second configuration, and localizing the robot in the envi-ronment is further based on the second overlapping data. In one aspect, the first time is a time during mission recording, and the second time is a time during mission playback. In one aspect, the first time is a time during mission playback, and the second time is a time during mission recording.

In one aspect, the robot includes a payload coupled thereto, and determining, for a first configuration of the robot at a first time, first sensor data that is not occluded by a portion of the robot comprises determining first sensor data that is not occluded by the payload. In one aspect, the method further comprises modeling the payload as a geo-metric shape coupled to the robot, and determining, for a first configuration of the robot at a first time, first sensor data that is not occluded by the payload comprises determining first sensor data that is not occluded by the modeled geo-metric shape. In one aspect, the first sensor data and the second sensor data comprises LIDAR data captured by at least one LIDAR sensor coupled to a body of the robot, and the payload is coupled to the body of the robot on a same surface as the LIDAR sensor. In one aspect, the robot includes an arm, and determining, for a first configuration of the robot at a first time, first sensor data that is not occluded by a portion of the robot comprises determining first sensor data that is not occluded by the arm.

In one aspect, the first configuration includes one or more parameters describing a state of the robot at the first time. In one aspect, the one or more parameters include information describing one or more of position, orientation, joint angles, and payload information. In one aspect, the first sensor data and the second sensor data comprises LIDAR data captured by at least one LIDAR sensor coupled to the robot. In one aspect, the LIDAR sensor is a scanning LIDAR sensor configured to obtain information about objects in a 360° view of the environment surrounding the robot. In one aspect, determining, for a first configuration of the robot at a first time, first sensor data that is not occluded by a portion of the robot comprises receiving a map of the environment that includes configuration data specifying the first configu-ration of the robot at the first time; and determining the first sensor data based on the configuration data included in the map. In one aspect, the configuration data included in the map includes information about a position of a payload coupled to the robot at the first time.

In one aspect, determining, for a first configuration of the robot at a first time, first sensor data that is not occluded by a portion of the robot comprises receiving a map of the environment that includes the first sensor data. In one aspect, determining first overlapping data corresponding to second sensor data that overlaps the first sensor data when the robot is in the first configuration comprises rendering the second sensor data as if it were observed from the first configura-tion. In one aspect, rendering the second sensor data as if it were observed from the first configuration comprises includ-ing in the first overlapping data only second sensor data that would not have been occluded by a part of the robot when in the first configuration. In one aspect, localizing the robot in the environment based on the first overlapping data and the second overlapping data comprises localizing the robot in the environment by matching the first overlapping data to the second overlapping data.

In some embodiments, a mobile robot is provided. The mobile robot comprises a body, one or more locomotion-based structures coupled to the body and configured to move the mobile robot though an environment, a sensor coupled to the body, the sensor configured to sense information about the environment, at least one storage device configured to store a map of the environment, the map including configu-ration information associated with a first configuration of the mobile robot at a first time, and at least one computer processor. The at least one computer processor is configured to determine, based on the configuration information, first sensor data sensed by the sensor that is not occluded by a portion of the mobile robot, determine, for a second con-figuration of the robot at a second time, second sensor data sensed by the sensor that is not occluded by a portion of the mobile robot, determine first overlapping data correspond-ing to second sensor data that overlaps the first sensor data when the robot is in the first configuration, and localize the mobile robot in the environment based on the first overlap-ping data.

In one aspect, the at least one computer processor further configured to determine second overlapping data corre-sponding to first sensor data that overlaps the second sensor data when the mobile robot is in the second configuration, and localizing the mobile robot in the environment is further based on the second overlapping data. In one aspect, the first time is a time during mission recording, and the second time is a time during mission playback. In one aspect, the first time is a time during mission playback, and the second time is a time during mission recording. In one aspect, the mobile robot further comprises a payload coupled the body, wherein determining, for a first configuration of the mobile robot at a first time, first sensor data that is not occluded by a portion of the mobile robot comprises determining first sensor data that is not occluded by the payload. In one aspect, the at least one computer processor further configured to model the payload as a geometric shape, and determining, for a first configuration of the mobile robot at a first time, first sensor data that is not occluded by the payload comprises determining first sensor data that is not occluded by the modeled geometric shape. In one aspect, the sensor is a LIDAR sensor, and the payload is coupled to the body on a same surface as the LIDAR sensor. In one aspect, the mobile robot further comprises an arm, wherein determining, for a first configuration of the mobile robot at a first time, first sensor data that is not occluded by a portion of the mobile robot comprises determining first sensor data that is not occluded by the arm.

In one aspect, the first configuration includes one or more parameters describing a state of the mobile robot at the first time. In one aspect, the one or more parameters include information describing one or more of position, orientation, joint angles, and payload information. In one aspect, the sensor is a LIDAR sensor. In one aspect, the LIDAR sensor is a scanning LIDAR sensor configured to obtain information about objects in a 360° view of the environment surrounding the mobile robot. In one aspect, determining, for a first configuration of the mobile robot at a first time, first sensor data that is not occluded by a portion of the mobile robot comprises receiving a map of the environment that includes configuration data specifying the first configuration of the mobile robot at the first time, and determining the first sensor data based on the configuration data included in the map. In one aspect, the configuration data included in the map includes information about a position of a payload coupled to the mobile robot at the first time.

In one aspect, determining, for a first configuration of the mobile robot at a first time, first sensor data that is not occluded by a portion of the mobile robot comprises receiving a map of the environment that includes the first sensor data. In one aspect, determining first overlapping data corresponding to second sensor data that overlaps the first sensor data when the mobile robot is in the first configuration comprises rendering the second sensor data as if it were observed from the first configuration. In one aspect, rendering the second sensor data as if it were observed from the first configuration comprises including in the first overlapping data only second sensor data that would not have been occluded by a part of the mobile robot when in the first configuration. In one aspect, localizing the mobile robot in the environment based on the first overlapping data and the second overlapping data comprises localizing the mobile robot in the environment by matching the first overlapping data to the second overlapping data.

In some embodiments, a non-transitory computer readable medium encoded with a plurality of instructions that, when executed by at least one computer processor perform a method is provided. The method comprises determining, for a first configuration of the robot at a first time, first sensor data that is not occluded by a portion of a mobile robot, determining, for a second configuration of the robot at a second time, second sensor data that is not occluded by a portion of the mobile robot, determining first overlapping data corresponding to second sensor data that overlaps the first sensor data when the robot is in the first configuration, and localizing the mobile robot in the environment based on the first overlapping data.

In one aspect, the method further comprises determining second overlapping data corresponding to first sensor data that overlaps the second sensor data when the robot is in the second configuration, and localizing the robot in the environment is further based on the second overlapping data. In one aspect, the first time is a time during mission recording, and the second time is a time during mission playback. In one aspect, the first time is a time during mission playback, and the second time is a time during mission recording. In one aspect, the robot includes a payload coupled thereto, and determining, for a first configuration of the robot at a first time, first sensor data that is not occluded by a portion of the robot comprises determining first sensor data that is not occluded by the payload. In one aspect, the method further comprises modeling the payload as a geometric shape coupled to the robot, and determining, for a first configuration of the robot at a first time, first sensor data that is not occluded by the payload comprises determining first sensor data that is not occluded by the modeled geometric shape. In one aspect, the first sensor data and the second sensor data comprises LIDAR data captured by at least one LIDAR sensor coupled to a body of the robot, and the payload is coupled to the body of the robot on a same surface as the LIDAR sensor. In one aspect, the robot includes an arm, and determining, for a first configuration of the robot at a first time, first sensor data that is not occluded by a portion of the robot comprises determining first sensor data that is not occluded by the arm.

In one aspect, the first configuration includes one or more parameters describing a state of the robot at the first time. In one aspect, the one or more parameters include information describing one or more of position, orientation, joint angles, and payload information. In one aspect, the first sensor data and the second sensor data comprises LIDAR data captured by at least one LIDAR sensor coupled to the robot. In one aspect, the LIDAR sensor is a scanning LIDAR sensor configured to obtain information about objects in a 360° view of the environment surrounding the robot. In one aspect, determining, for a first configuration of the robot at a first time, first sensor data that is not occluded by a portion of the robot comprises receiving a map of the environment that includes configuration data specifying the first configuration of the robot at the first time, and determining the first sensor data based on the configuration data included in the map. In one aspect, the configuration data included in the map includes information about a position of a payload coupled to the robot at the first time.

In one aspect, determining, for a first configuration of the robot at a first time, first sensor data that is not occluded by a portion of the robot comprises receiving a map of the environment that includes the first sensor data. In one aspect, determining first overlapping data corresponding to second sensor data that overlaps the first sensor data when the robot is in the first configuration comprises rendering the second sensor data as if it were observed from the first configuration. In one aspect, rendering the second sensor data as if it were observed from the first configuration comprises including in the first overlapping data only second sensor data that would not have been occluded by a part of the robot when in the first configuration. In one aspect, localizing the robot in the environment based on the first overlapping data and the second overlapping data comprises localizing the robot in the environment by matching the first overlapping data to the second overlapping data.

The foregoing apparatus and method embodiments may be implemented with any suitable combination of aspects, features, and acts described above or in further detail below.

These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 5 is a flowchart of a process for localizing a robot based, at least in part, on self-occlusion information, in accordance with some embodiments of the present disclosure.

DETAILED DESCRIPTION

Figure 1A:
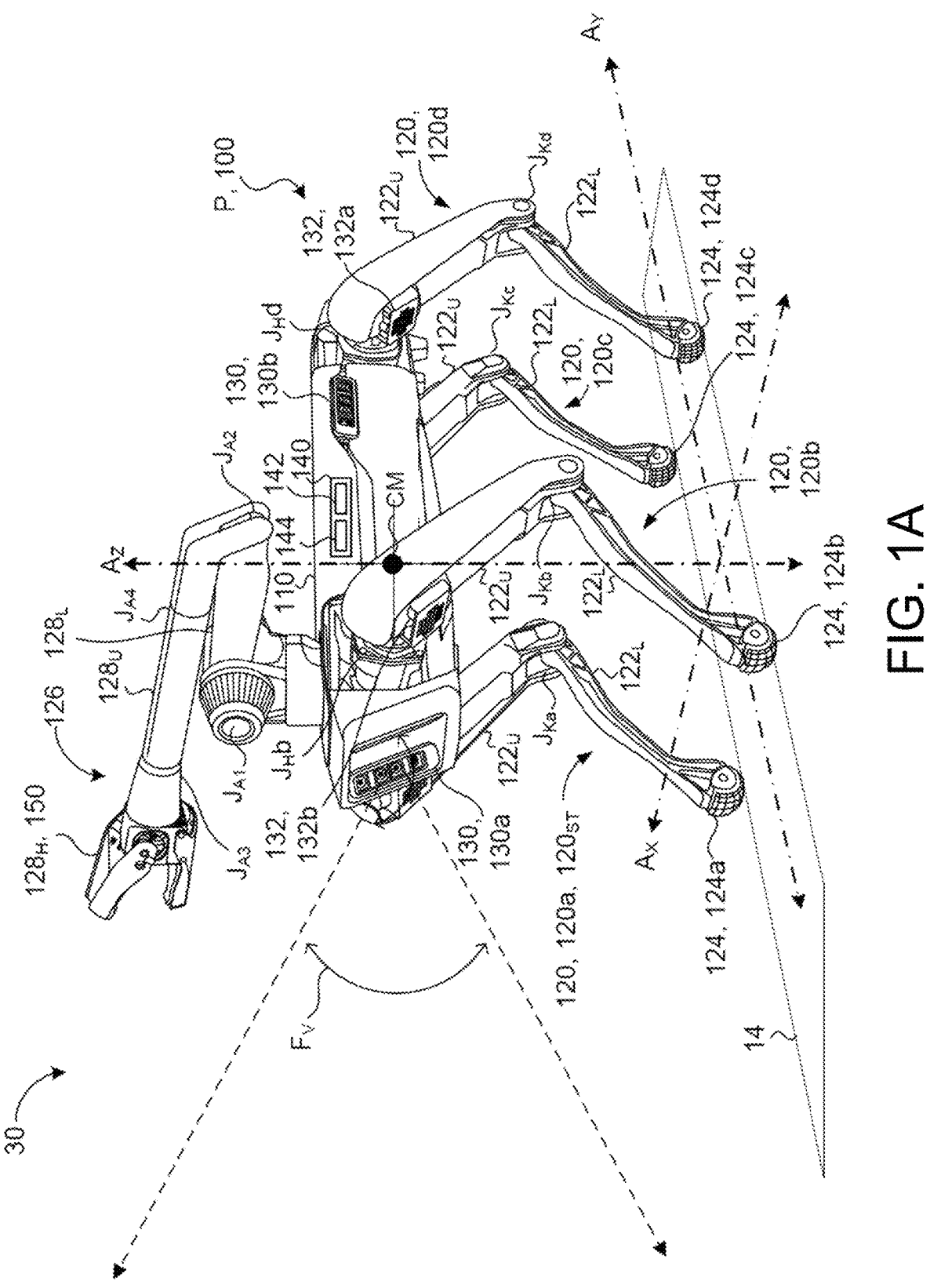
FIG. 1A is a schematic view of an example robot for navigating through an environment.

Some robots are used to navigate environments to perform a variety of tasks or functions. These robots are often operated to perform a "mission" by navigating the robot through an environment. The mission is sometimes recorded so that the robot can again perform the mission at a later time. In some missions, a robot both navigates through and interacts with the environment. The interaction sometimes takes the form of gathering data using one or more sensors.

When executing a previously-recorded mission, a robot may attempt to localize itself within an environment (e.g., a building, a room, a hallway) by using sensor data captured by one or more sensors located on the robot. Localization may be performed by comparing sensor data collected from a previous time (e.g., a time when the mission was recorded, also referred to herein as "mission record time") with sensor data collected at the current time (also referred to herein as "mission playback time"). It should be appreciated that mission record time may be on the order of minutes, hours or days before mission playback time. When performing localization in this way, it may be assumed that the configuration of the robot at the previous time and the configuration of the robot at the current time is the same, such that the sensor data from the current time can be accurately matched to the sensor data from the previous time. As used herein, a "configuration" of a robot may include a position and orientation of the base of the robot, as well as any internal configuration information about the robot (e.g., joint angles, position of arm if present, poses of one or more sensors, characteristics, location and/or orientation of a payload relative to sensor(s) if present).

The inventor has recognized and appreciated that in some instances, the configuration of the robot at the current time may be different than the configuration of the robot at the previous time. As an example of a change in configuration, some of the sensor data collected at the previous time (e.g., during record time) may have been occluded by a portion of the robot (e.g., a payload coupled to the robot in the sensor's field of view) in a different way than the sensor data collected at the current time. Accordingly, there may be sensor data that the robot can observe at the current time that could not have been observed at the previous time due to the occlusion. In such instances, if the robot naively assumes that the configuration of the robot is the same at the current time as it was at the previous time, the sensor data from the current time and the previous time may not be aligned properly, resulting in poor localization of the robot in the environment.

Some embodiments of the present disclosure relate to localization techniques for a mobile robot that take into account changes in the configuration of the robot and/or the environment when comparing sensor data recorded at a current time and sensor data recorded at a previous time (e.g., mission record time). As discussed in further detail herein, a robot configured in accordance with some embodiments may explicitly model occlusions made by its own body both during record time and during localization time (e.g., current time), and sensor data corresponding to its own body (self-occlusion data) during the previous time (e.g., recording time) or during the current time is not used for localization. By eliminating such sensor data from the localization process, the techniques described herein perform localization based on sensor data that more likely corresponds to objects in the environment rather than points on the robot itself. Additionally, as described herein, the techniques described herein perform localization by excluding current sensor data (e.g., at mission playback time) that could not have been observed in sensor data at mission record time due to occlusions (e.g., because that current sensor data was occluded at mission record time by a payload of the robot).

Figure 1B:
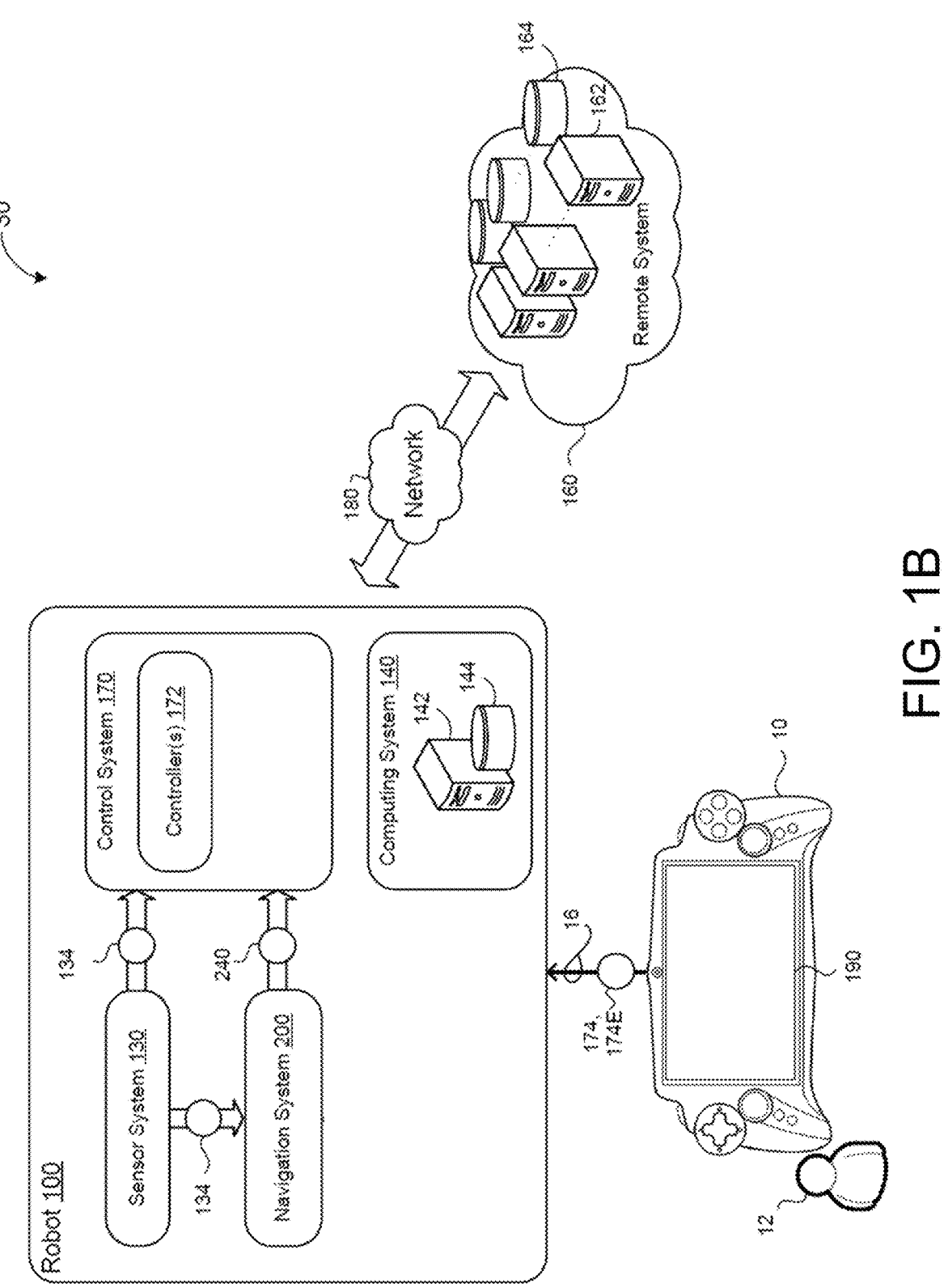
FIG. 1B is a schematic view of a navigation system for navigating a robot such as the robot of FIG. 1A.

Referring to FIGS. 1A and 1B, in some implementations, a robot 100 includes a body 110 with locomotion based structures such as legs 120a-d coupled to the body 110 that enable the robot 100 to move through the environment 30. In some examples, each leg 120 is an articulable structure such that one or more joints J permit members 122 of the leg 120 to move. For instance, each leg 120 includes a hip joint $J_H$ coupling an upper member 122, 122U of the leg 120 to the body 110 and a knee joint $J_K$ coupling the upper member 122U of the leg 120 to a lower member 122L of the leg 120. Although FIG. 1A depicts a quadruped robot with four legs 120a-d, the robot 100 may include any number of legs or locomotive based structures (e.g., a biped or humanoid robot with two legs, or other arrangements of one or more legs) that provide a means to traverse the terrain within the environment 30.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint $J_A$ such that the distal end 124 is articulable with respect to the lower member 122L of the leg 120.

In the examples shown, the robot 100 includes an arm 126 that functions as a robotic manipulator. The arm 126 may be configured to move about multiple degrees of freedom in order to engage elements of the environment 30 (e.g., objects within the environment 30). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $128_L$, an upper member $128_U$, and a hand member $128_H$ (e.g., shown as an end-effector 150). Here, the lower member $128_L$ may rotate or pivot about a first arm joint $J_{A1}$ located adjacent to the body 110 (e.g., where the arm 126 connects to the body 110 of the robot 100). The lower member $128_L$ is coupled to the upper member $128_U$ at a second arm joint $J_{A2}$ and the upper member $128u$ is coupled to the hand member $128_H$ at a third arm joint $J_{A3}$. In some examples, such as FIG. 1A, the hand member $128_H$ or end-effector 150 is a mechanical gripper that includes a moveable jaw and a fixed jaw configured to perform different types of grasping of elements within the environment 30. The moveable jaw is configured to move relative to the fixed jaw to move between an open position for the gripper and a closed position for the gripper. In some implementations, the arm 126 additionally includes a fourth joint $J_{A4}$. The fourth joint $J_{A4}$ may be located near the coupling of the lower member $128_L$ to the upper member $128_U$ and function to allow the upper member $128_U$ to twist or rotate relative to the lower member $128_L$. In other words, the fourth joint $J_{A4}$ may function as a twist joint similarly to the third joint $J_{A3}$ or wrist joint of the arm 126 adjacent the hand member $128_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 attaches or detaches from the robot 100 depending on whether the arm 126 is needed for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction. The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y direction axis $A_Y$. The ground plane refers to a ground surface 14 where distal ends 124 of the legs 120 of the robot 100 may generate traction to help the robot 100 move about the environment 30. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z direction axis $A_z$.

In order to maneuver about the environment 30 or to perform tasks using the arm 126, the robot 100 includes a sensor system 130 with one or more sensors 132, 132a-n (e.g., shown as a first sensor 132, 132a and a second sensor 132, 132b). The sensors 132 may include vision/image sensors, inertial sensors (e.g., an inertial measurement unit (IMU)), force sensors, and/or kinematic sensors. Some examples of sensors 132 include a camera such as a visual camera (e.g., an RGB camera), stereo camera, a scanning light-detection and ranging (LIDAR) sensor, or a scanning laser-detection and ranging (LADAR) sensor. In some examples, the sensor 132 has a corresponding field(s) of view Fv defining a sensing range or region corresponding to the sensor 132. For instance, FIG. 1A depicts a field of a view Fv for a sensor system 130a located on the front of the robot 100. At least some of the sensors 132 within sensor system 130 may be pivotable and/or rotatable such that the sensor 132, for example, changes its field of view Fv about one or more axis (e.g., an x-axis, a y-axis, or a z-axis in relation to a ground plane). The one or more sensors 132 of the sensor system 130 capture sensor data 134 that defines a three-dimensional point cloud for the area within the environment 30 about the robot 100.

Although not shown in FIG. 1A, in some implementations, sensor system 130 additionally includes one or more sensors 132 mounted on a top surface of body 110 of robot 100. In some implementations, the sensor(s) 132 mounted on the top surface of body 110 may include a scanning LIDAR sensor configured to have a 360 degree field of view surrounding the robot. At least a portion of the field of view of the sensor may be occluded by a portion of the robot. For instance, when located on the top surface of body 110 behind arm 126, a portion of the sensor's field of view located in front of the robot (e.g., 15-20 degrees in front of the robot may be occluded by the arm 126. Additionally, other components of the robot 100 mounted on or otherwise coupled to the top surface of the body 110 may also occlude a portion of the field of view of a sensor mounted on the top surface of the body 110. In such instances, a first portion of the sensor data captured by the sensor 132 corresponds to objects (e.g., walls) in the environment and a second portion of the sensor data captured by the sensor 132 corresponds to points on the robot itself (e.g., a payload, an arm, a leg). As described herein, some embodiments of the present disclosure distinguish between sensor data corresponding to objects in the environment and sensor data corresponding to points on the robot itself to improve localization of the robot 100 in its environment 30.

Additionally or alternatively, when the robot 100 is maneuvering about the environment 30, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 30 about the robot 100.

In some implementations, the sensor system 130 includes sensor(s) 132 coupled to a joint J. Moreover, these sensors 132 may couple to a motor M that operates a joint J of the robot 100 (e.g., sensors 132, 132a-b). Here, these sensors 132 generate joint dynamics in the form of joint-based sensor data 134. Joint dynamics collected as joint-based sensor data 134 may include joint angles (e.g., an upper member $122_U$ relative to a lower member $122_L$ or hand member $126_H$ relative to another member of the arm 126 or robot 100), joint speed, joint angular velocity, joint angular acceleration, and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 stores, processes, and/or to communicates the sensor data 134 to various systems of the robot 100 (e.g., the control system 170, a navigation system 200, and/or remote controller 10). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120), whereas a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remote from the robot 100. For instance, the computing system 140 communicates via a network 180 with a remote system 160 (e.g., a remote server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 reside on resources of the remote system 160.

In some implementations, as shown in FIGS. 1A and 1B, the robot 100 includes a control system 170. The control system 170 may be configured to communicate with systems of the robot 100, such as the at least one sensor system 130 and/or the navigation system 200. The control system 170 may perform operations and other functions using hardware 140. The control system 170 includes at least one controller 172 that is configured to control the robot 100. For example, the controller 172 controls movement of the robot 100 to traverse about the environment 30 based on input or feedback from the systems of the robot 100 (e.g., the sensor system 130 and/or the control system 170). In additional examples, the controller 172 controls movement between poses and/or behaviors of the robot 100. The at least one controller 172 may be responsible for controlling movement of the arm 126 of the robot 100 in order for the arm 126 to perform various tasks using the end-effector 150. For instance, at least one controller 172 controls the end-effector 150 (e.g., a gripper) to manipulate an object or element in the environment 30. For example, the controller 172 actuates the movable jaw in a direction towards the fixed jaw to close the gripper. In other examples, the controller 172 actuates the movable jaw in a direction away from the fixed jaw to close the gripper.

A given controller 172 may control the robot 100 by controlling movement about one or more joints J of the robot 100. In some configurations, the given controller 172 is implemented as software or firmware with programming logic that controls at least one joint J or a motor M which operates, or is coupled to, a joint J. A software application (i.e., a software resource) may refer to computer software that causes a computing device to perform a task. In some examples, a software application may be referred to as an "application," an "app," or a "program." For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member 128H) of the robot 100. By controlling one or more joints J, actuators or motors M, the controller 172 may coordinate movement for all different parts of the robot 100 (e.g., the body 110, one or more legs 120, the arm 126). For example, to perform some movements or tasks, a controller 172 may be configured to control movement of multiple parts of the robot 100 such as, for example, two legs 120a-b, four legs 120a-d, or two legs 120a-b combined with the arm 126.

With continued reference to FIG. 1B, an operator 12 (also referred to herein as a user or a client) may interact with the robot 100 via the remote controller 10 that communicates with the robot 100 to perform actions. For example, the operator 12 transmits commands 174 to the robot 100 (executed via the control system 170) via a wireless communication network 16. Additionally, the robot 100 may communicate with the remote controller 10 to display an image on a user interface 190 (e.g., UI 190) of the remote controller 10. For example, the UI 190 is configured to display the image that corresponds to three-dimensional field of view Fv of the one or more sensors 132. The image displayed on the UI 190 of the remote controller 10 is a two-dimensional image that corresponds to the three-dimensional point cloud of sensor data 134 for the area within the environment 30 about the robot 100. That is, the image displayed on the UI 190 may be a two-dimensional image representation that corresponds to the three-dimensional field of view Fv of the one or more sensors 132.

Figure 2A:
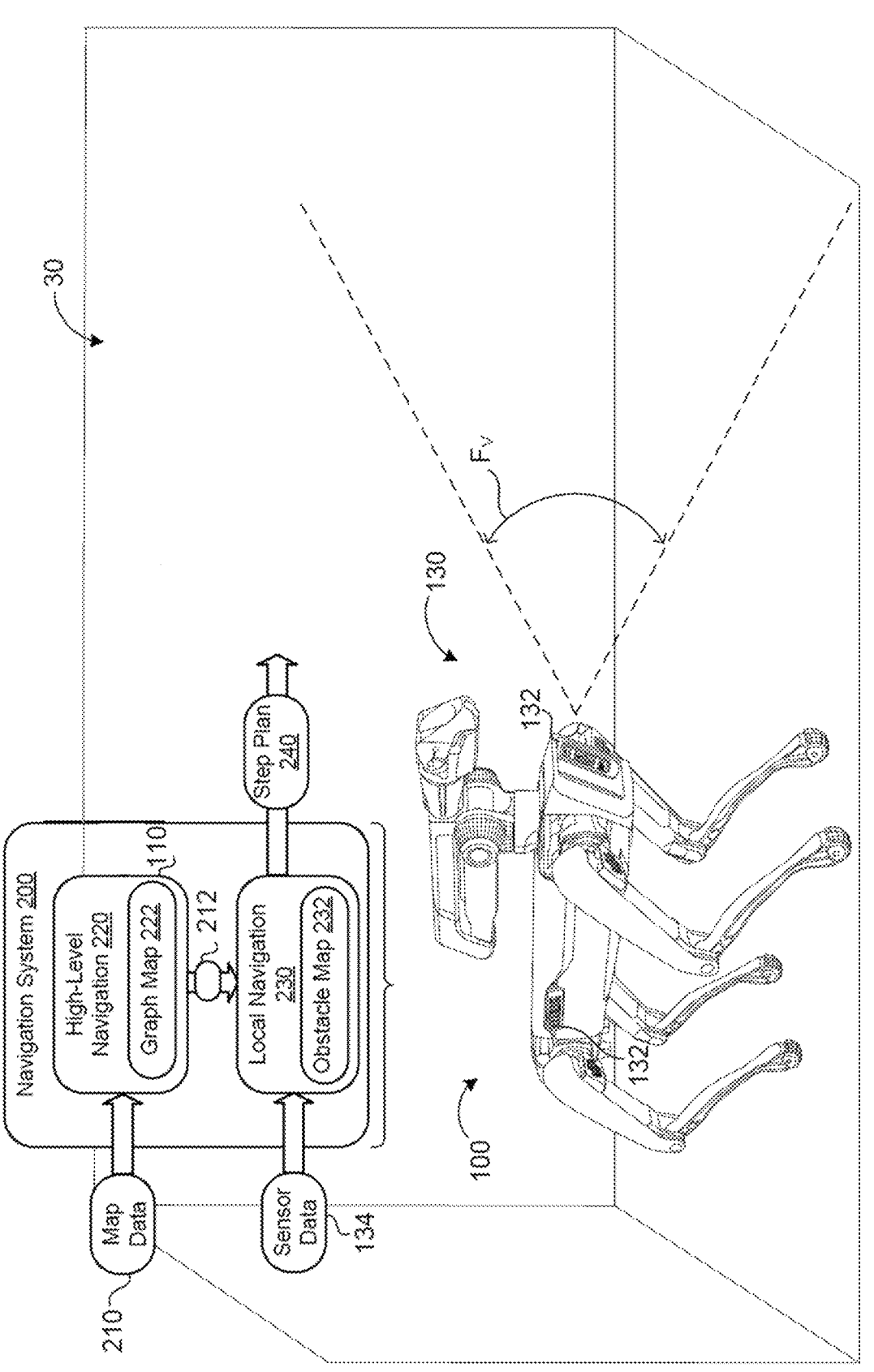
FIG. 2A is a schematic view of exemplary components of a navigation system such as the navigation system illustrated in FIG. 1B.

Referring now to FIG. 2A, the robot 100 (e.g., the data processing hardware 142) executes the navigation system 200 for enabling the robot 100 to navigate the environment 30. For example, the sensor system 130 includes one or more imaging sensors 132 (e.g., cameras) each of which captures image data or other sensor data 134 of the environment 30 surrounding the robot 100 within the field of view Fv. The sensor system 130 may be configured to move the field of view Fv of some or all of the sensors 130 by adjusting an angle of view or by panning and/or tilting (either independently or via the robot 100) one or more sensors 132 to move the field of view Fv of the sensor(s) 132 in any direction. In some implementations, the sensor system 130 includes multiple sensors or cameras 132 such that the sensor system 130 captures a generally 360-degree field of view around the robot 100. As described herein, in some implementations sensor system 130 includes a scanning LIDAR sensor arranged on a top surface of body 110, wherein the scanning LIDAR sensor is configured to acquire sensor data in a 360-degree field of view around the robot. Such sensor data may be used, among other things, to localize the robot 100 in environment 30.

Figure 2B:
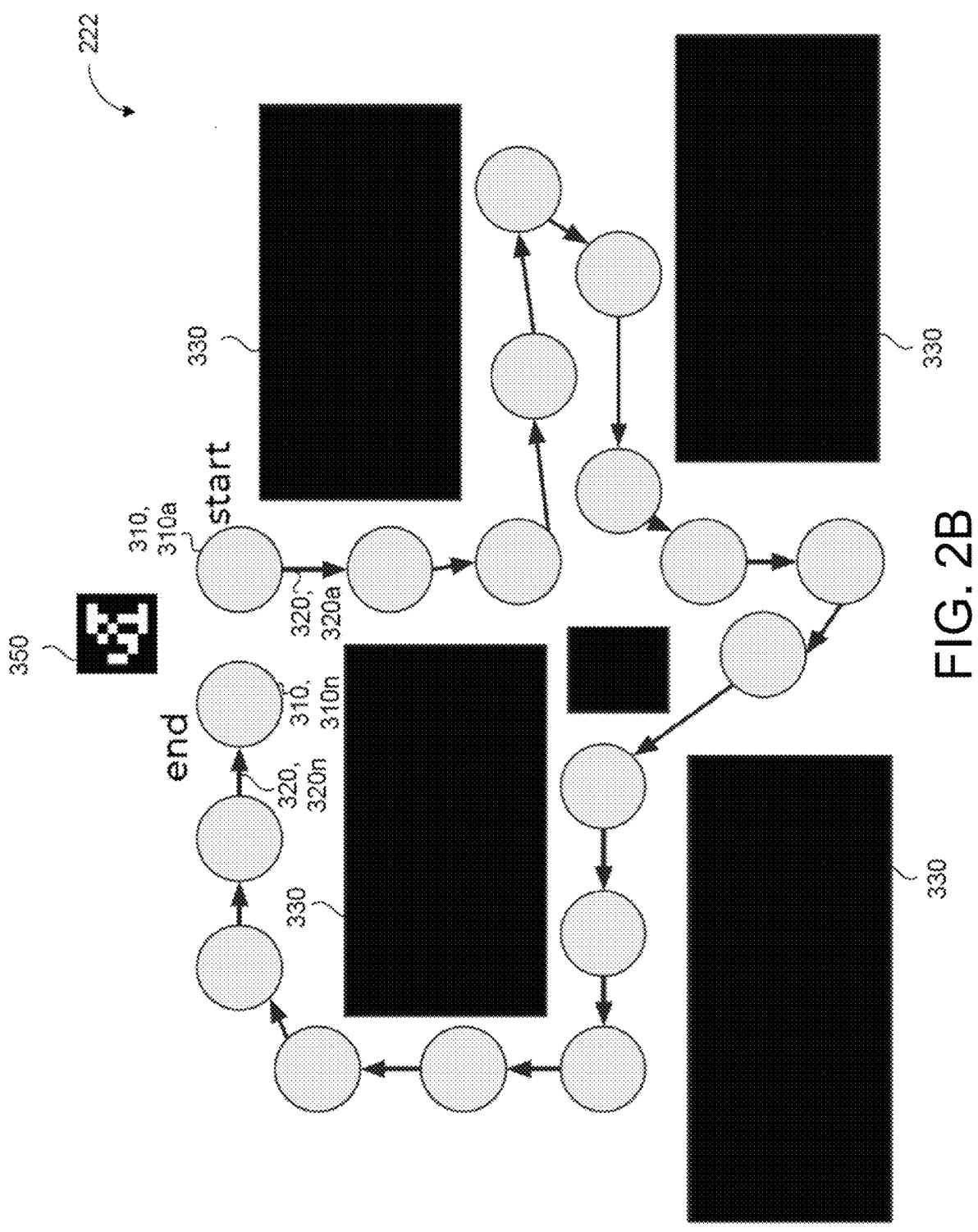
FIG. 2B is a schematic view of a topological map that may be used for navigating a robot such as the robot of FIG. 1A.

In the example shown, the navigation system 200 includes a high-level navigation module 220 that receives map data 210 (e.g., high-level navigation data representative of locations of static obstacles (e.g., walls) in an area the robot 100 is to navigate). In some examples, the map data 210 includes a graph map 222. In other examples, the high-level navigation module 220 generates the graph map 222 (e.g., during recording of a mission). The graph map 222 includes a topological map of a given area the robot 100 is to traverse. The high-level navigation module 220 obtains (e.g., from the remote system 160 or the remote controller 10) or generates a series of route waypoints 310 on the graph map 222 for a navigation route 212 that plots a path around large and/or static obstacles from a start location (e.g., the current location of the robot 100) to a destination as shown in FIG. 2B. Route edges 312 connect corresponding pairs of adjacent route waypoints 310. In some examples, the route edges 312 record geometric transforms between route waypoints 310 based on odometry data (i.e., data from motion sensors or image sensors to determine a change in the robot's position over time). The route waypoints 310 and the route edges 312 are representative of the navigation route 212 for the robot to follow from a start location to a destination location.

In some implementations, the high-level navigation module 220 produces the navigation route 212 over a greater than 10-meter scale (e.g., distances greater than 10 meters from the robot 100). The navigation system 200 also includes a local navigation module 230 that receives the navigation route 212 and the image or sensor data 134 from the sensor system 130. The local navigation module 230, using the sensor data 134, generates an obstacle map 232. The obstacle map 232 is a robot-centered map that maps obstacles (both static and dynamic) in the vicinity of the robot 100 based on the sensor data 134. For example, while the graph map 222 includes information relating to the locations of walls of a hallway, the obstacle map 232 (populated by the sensor data 134 as the robot 100 traverses the environment 30) may include information regarding a stack of boxes placed in the hallway that may not have been present during recording of the mission. The size of the obstacle map 232 may be dependent upon both the operational range of the sensors 132 and the available computational resources.

The local navigation module 230 generates a step plan 240 (e.g., using an A* search algorithm) that plots each individual step (or other movement) of the robot 100 to navigate from the current location of the robot 100 to the next route waypoint 310 along the navigation route 212. Using the step plan 240, the robot 100 maneuvers through the environment 30. The local navigation module 230 may find a path for the robot 100 to the next route waypoint 310 using an obstacle grid map based on the captured sensor data 134. In some examples, the local navigation module 230 operates on a range correlated with the operational range of the sensor 132 (e.g., four meters) that is generally less than the scale of high-level navigation module 220.

In some implementations, the graph map 222 includes information related to one or more fiducial markers 350. Each fiducial marker 350 may correspond to an object that is placed within the field of sensing of the robot 100, and the robot 100 may use the fiducial marker 350 as a fixed point of reference. Non-limiting examples of fiducial marker 350 include a bar code, a QR-code, an AprilTag, or other readily identifiable pattern or shape for the robot 100 to recognize. When placed in the environment of the robot, fiducial markers 350 may aid in localization within and/or navigation through the environment.

In some implementations, the graph map 222 include configuration information describing, for example, a state of the robot 100 and/or the environment 30 at a time when sensor data used to construct the graph map 222 was collected (e.g., during mission record time). For instance, the configuration information stored in the graph map 222 may include one or more parameters describing the state of the robot 100. The one or more parameters describing the state of the robot 100 may include, but is not limited to, its position, orientation, joint angles, and information about a payload mounted on or otherwise coupled to the robot. For instance, the information about a payload may include information describing the presence/absence of the payload, information about the size, shape, and/or position of the payload on the robot, or other suitable information about the payload that may be used to determine portions of a sensor's field of view that are occluded by the payload when sensor data is captured by the sensor. In some implementations, a payload included as a portion of the robot may be modeled as a geometric shape (e.g., a three-dimensional object such as a box) having at least one dimension (e.g., height) specified in the stored configuration information.

The configuration information stored as part of graph map 222 may be stored in association with one or more way-points 310 and/or one or more edges 320 when a mission is recorded such that, when the previously-recorded mission is executed (also referred to herein as "mission playback time" or "current time"), the relevant configuration information corresponding to the robot's current position along the route defined in the mission may be accessed from the map and used to perform localization using one or more of the techniques described herein.

Figures 3A, 3B:
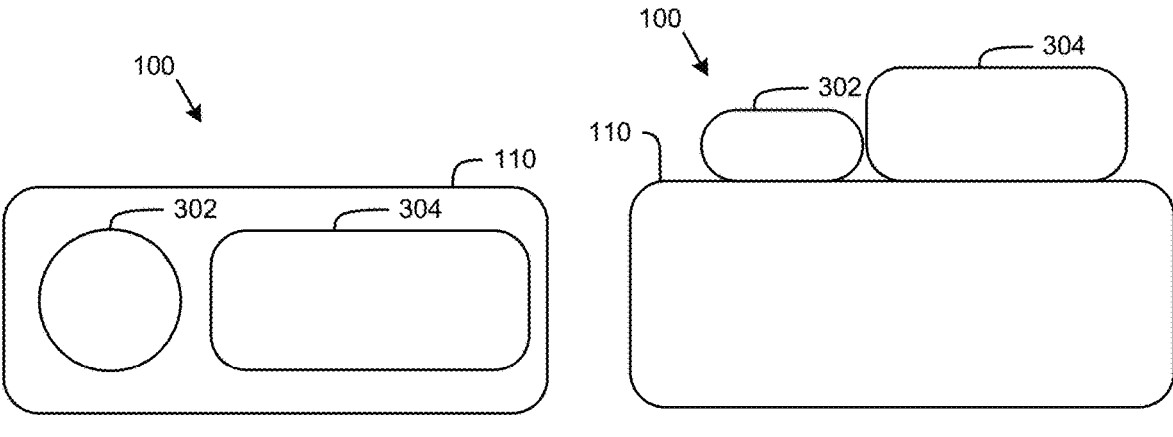
FIG. 3A schematically illustrates a top view of a robot that includes a sensor and an occluding component that occludes a portion of the field of view of the sensor.
FIG. 3B schematically illustrates a side view of a robot such as the robot shown in FIG. 3A that includes a sensor and an occluding component that occludes a portion of the field of view of the sensor.

FIG. 3A schematically illustrates a top view of a robot 100. Robot 100 includes a sensor 302 (e.g., a scanning LIDAR sensor) mounted on a top surface of body 110 and an occluding component 304 arranged in front of the sensor 302 on the top surface of body 110. Occluding component 304 may be, for example, a payload (e.g., another sensor, a computing device, etc.), an arm or another manipulator coupled to the robot 100, or any other component that occludes at least a portion of the field of view of sensor 302. FIG. 3B shows a side view of the robot 100 shown in FIG. 3A.

Figure 3C:
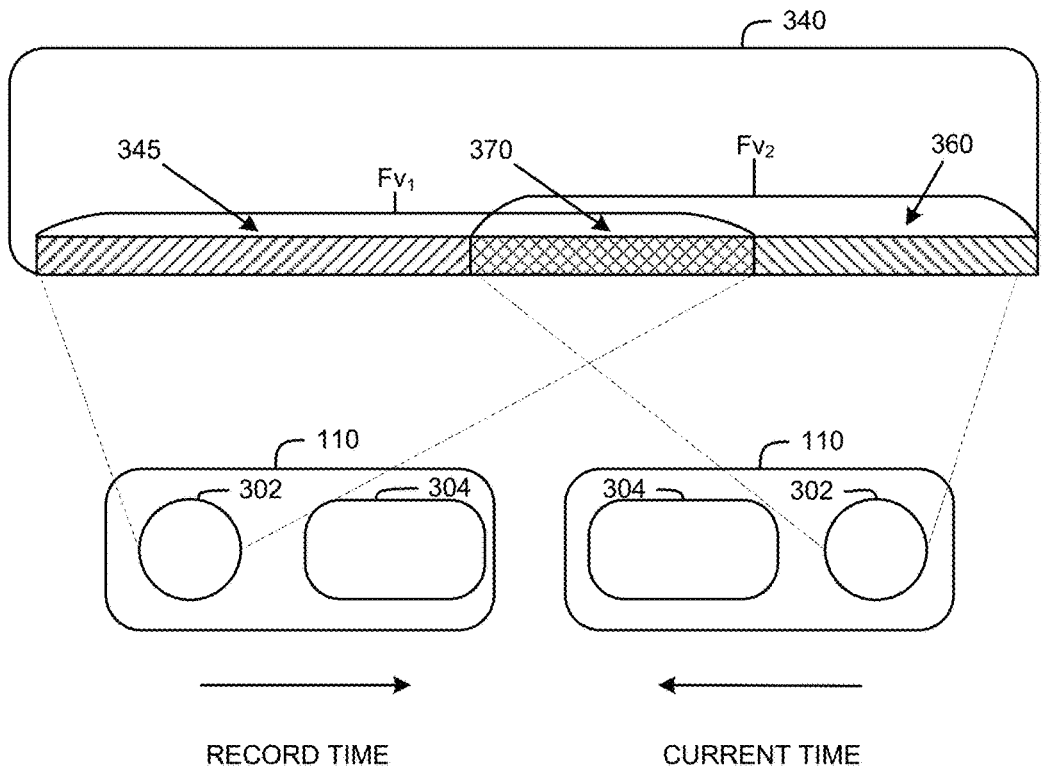
FIG. 3C schematically illustrates a process for taking into account different configurations of a robot, such as the robot shown in FIG. 3A, when performing localization, in accordance with some embodiments of the present disclosure.

FIG. 3C schematically illustrates how the presence of occluding component 304 on body 110 of robot 100 partially occludes the field of view of sensor 302 in different ways at two different points in time. In the example of FIG. 3C, at a first time (e.g., mission record time), robot 100 is in a first configuration travelling from left to right down a hallway having a wall 340. Sensor 302 has a field of view along wall 340 that is partially occluded by occluding component 304, resulting in an effective field of view $Fv_1$ (a field of view that is not obstructed by a portion of robot 100) along wall 340 at the first time. At a second time (e.g., current time), robot 100 is in a second configuration travelling from right to left along the same hallway having wall 340. Sensor 302 has a field of view along wall 340 that is partially occluded by occluding component 304 resulting in an effective field of view $Fv_2$ along wall 340 at the second time. As shown, when comparing sensor data recorded along wall 340 during the first time (e.g., record time) and the second time (e.g., current time), three types of sensor data are identified. Region 345 includes sensor data that was observable by sensor 302 at record time, but is not observable at the current time; region 360 includes sensor data that is observable by sensor 302 at the current time, but was not observable at record time; and region 370 is an overlapping region located between regions 345 and 360 that includes sensor data observable by sensor 302 at both the current time and record time. As described in further detail herein, some embodiments of the present disclosure perform localization based only on sensor data included in an overlapping region (e.g., region 370) to prevent, for example, spurious matching of data observable at the current time to data that could not have been observed by the robot at record time.

Figure 4A:
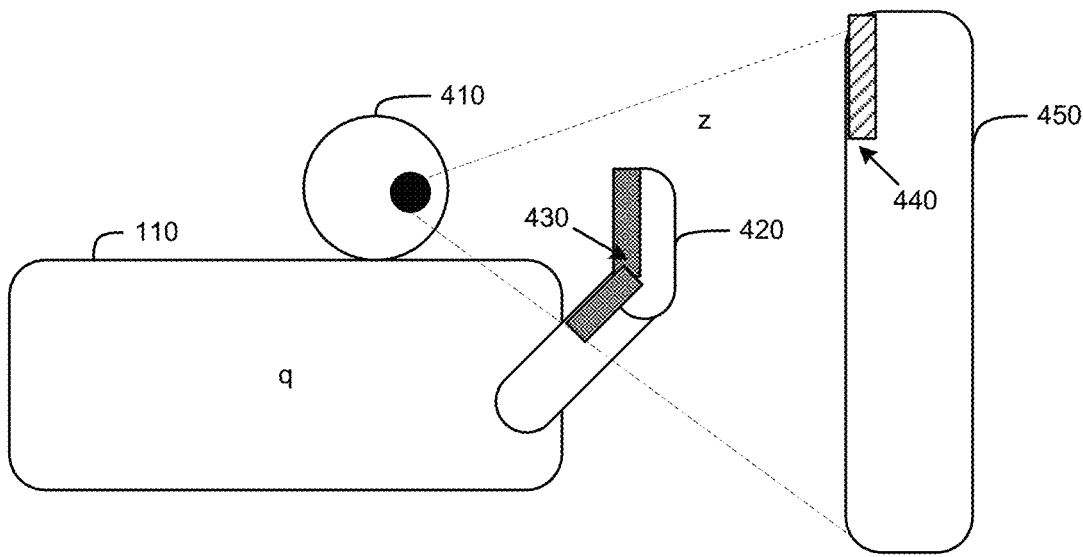
FIG. 4A schematically illustrates a robot configuration in which an arm of the robot occludes a portion of a field of view of a sensor used for localization of the robot in an environment.

FIG. 4A schematically illustrates a robot that includes a sensor 410 (e.g., a camera sensor) mounted on a surface of body 110 of the robot and an arm 420 coupled to the body 110. As shown, in a configuration "q," the arm 420 may be oriented such that a portion of the arm is arranged between the sensor 410 and an object (e.g., a wall) 450 in the environment of the robot. Because a portion of the field of view of the sensor 410 is occluded by the arm 420, the sensor data "z" recorded by the sensor 410 includes first sensor data 430 that corresponds to points on the arm 420 and second sensor data 440 that corresponds to points on the wall 450. One or more parameters corresponding to configuration q, such as the orientation of the arm 420 relative to the sensor 410, may be stored as a part of a graph map (e.g., graph map 222) to be used for localization of the robot during a future execution instance of the mission.

Figure 4B:
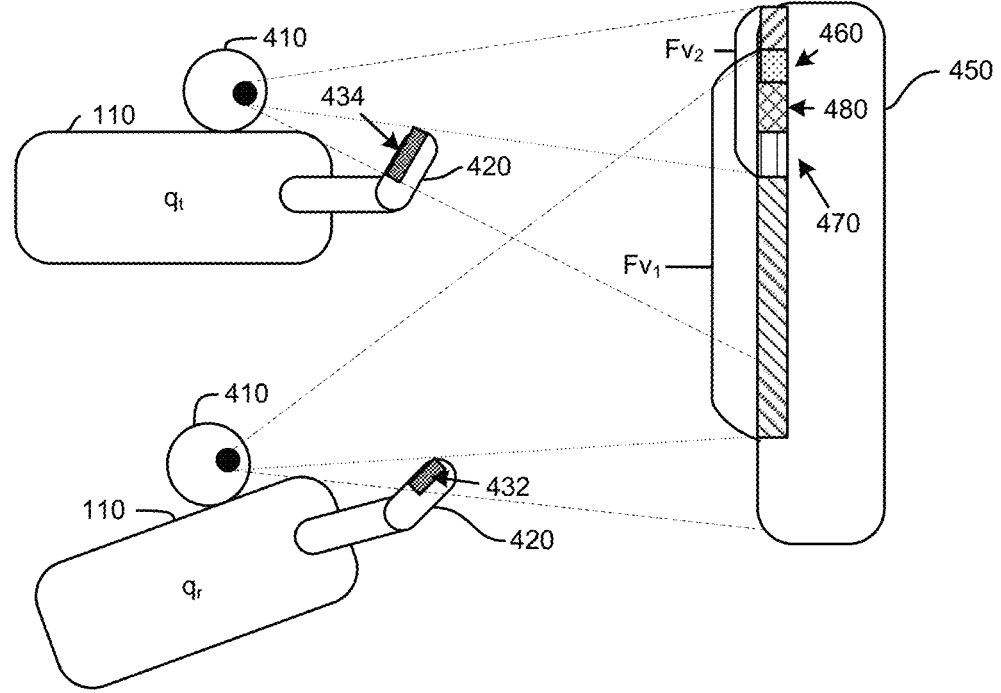
FIG. 4B schematically illustrates a process for taking into account different configurations of a robot, such as the robot shown in FIG. 4A, when performing localization, in accordance with some embodiments of the present disclosure.

FIG. 4B schematically illustrates how the presence of arm 420 of the robot shown in FIG. 4A may partially occlude the field of view of sensor 410 in different ways at two different points in time. In the example of FIG. 3C, at a first time (e.g., mission record time), the robot is in a first configuration $q_r$ relative to a wall 450. When in the first configuration $q_r$, sensor 410 has a field of view along wall 450 that is partially occluded by arm 420, resulting in an effective field of view $Fv_1$ (a field of view that is not obstructed by a portion of the robot) along wall 450 at the first time. Accordingly, the sensor data $z_r$ sensed by sensor 410 when the robot is in configuration $q_r$ includes first sensor data 432 corresponding to the arm 420 and second sensor data within the field of view $Fv_1$ corresponding to wall 450.

At a second time (e.g., current time during missing playback), the robot is in a second configuration $q_t$ relative to wall 450. When in the second configuration $q_t$, sensor 410 has a field of view along wall 450 that is partially occluded by arm 420, resulting in an effective field of view $Fv_2$ along wall 450 at the second time. Accordingly, the sensor data $z_t$ sensed by sensor 410 when the robot is in configuration $q_t$ includes first sensor data 434 corresponding to the arm 420 and second sensor data within the field of view $Fv_2$ corresponding to wall 450.

As shown, the sensor data corresponding to the wall 450 when the robot is in the configuration $q_r$ (sensor data within field of view $Fv_1$) at the first time partially overlaps with the sensor data corresponding to the wall 450 when the robot is in the configuration $q_t$ (sensor data within field of view $Fv_2$) at the second time. Stated differently, the fields of view $Fv_1$ and $Fv_2$ overlap within the regions 460, 470 and 480 as shown in FIG. 4B. As described in further detail with regard to the process shown in FIG. 5, the overlapping portion of the sensor data may be used for localization in accordance with some embodiments.

Figure 4C:
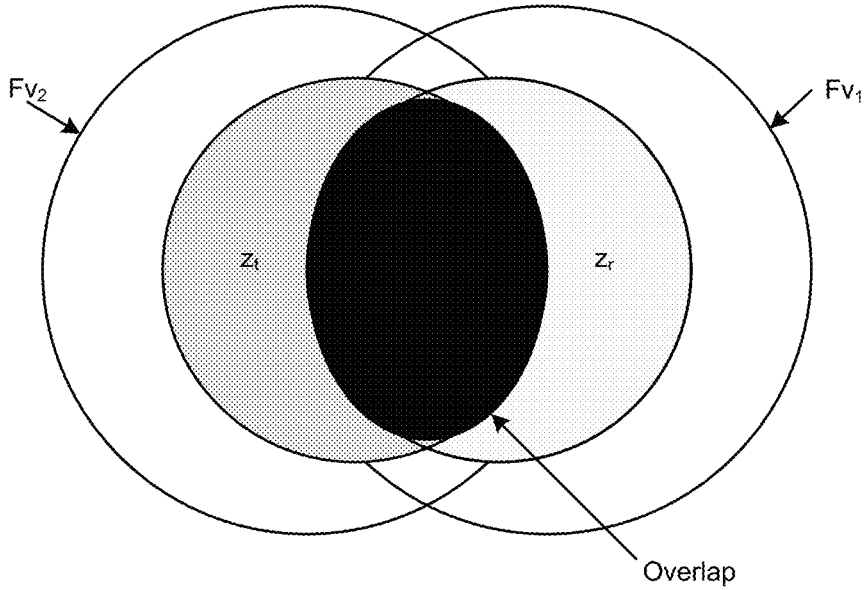
FIG. 4C schematically illustrates a process for taking into account different configurations of a robot and/or an environment when performing localization, in accordance with some embodiments of the present disclosure.

FIG. 4C schematically illustrates a Venn diagram showing that, considering two configurations $q_r$ and $q_t$ of a robot, a sensor of the robot can observe a subset of its field of view $Fv_1$, $Fv_2$ from its corresponding configuration. In the example of FIG. 4C, the sensor data $z_r$ observable from the configuration $q_r$ having the field of view $Fv_1$ overlaps the sensor data $z_t$ observable from the configuration $q_t$ having the field of view $Fv_2$. The overlap is determined in some embodiments by taking the intersection of the fields of view $Fv_1$, $Fv_2$ using a rendering operator R, as described in more detail with regard to the process shown in FIG. 5.

FIG. 5 illustrates a process 500 for localizing a robot in an environment using sensor data sensed when the robot is in two different configurations. In act 510, when the robot is in a first configuration (e.g., a configuration $q_r$) at a first time (e.g., mission record time) first sensor data not occluded by a portion of the robot is determined. Referring to the example illustrated in FIG. 3C, the first sensor data may correspond to the sensor data in regions 345 and 370 of the wall 340 within the field of view $Fv_1$. Referring to the example illustrated in FIG. 4B, the first sensor data may correspond to the sensor data along the wall 450 within the field of view $Fv_1$. As described herein, configuration information that includes one or more parameters describing configuration $q_r$ including a state of the robot at mission record time may be stored as a part of a graph map (e.g., graph map 222). The configuration information may include, for example, a position and orientation of the base of the robot, as well as any internal configuration information about the robot (e.g., position of arm if present, poses of the sensor, characteristics and location of a payload if present).

Process 500 then proceeds to act 520, where when the robot is in a second configuration (e.g., a configuration $q_t$) at a second time (e.g., a current time during mission playback) second sensor data not occluded by a portion of the robot is determined. Referring to the example illustrated in FIG. 3C, the second sensor data may correspond to the sensor data in regions 360 and 370 of the wall 340 within the field of view $Fv_2$. Referring to the example illustrated in FIG. 4B, the second sensor data may correspond to the sensor data along the wall 450 within the field of view $Fv_2$.

Process 500 then proceeds to act 530, where first overlapping data is determined, the first overlapping data corresponding to second sensor data that overlaps the first sensor data when the robot is in the first configuration. Stated differently, a function R(q, z) may defined, which renders sensor data (z) as if it were observed from configuration q. The rendering function R reasons about parts of the robot that may have occluded the field of view of the sensor when the robot was in configuration q, and rejects any sensor data z that would have corresponded to points on the robot (self-occluded sensor data) rather than objects in the environment. The rendering function R also rejects any sensor data in the environment that would have been occluded by points on the robot. For instance, for a camera-like sensor, a mask of the robot's body (e.g., an image where each pixel is labeled as "body" or "not body") at configuration q may be rendered using graphics rasterization. The rendering function R may project the sensor data back onto the camera-like sensor at configuration q (e.g., using graphics rasterization), yielding pixels that correspond to the sensor data to render. Using the mask, if the pixel corresponds to a "body" pixel, it is rejected. Otherwise, it is accepted.

Figure 4D:
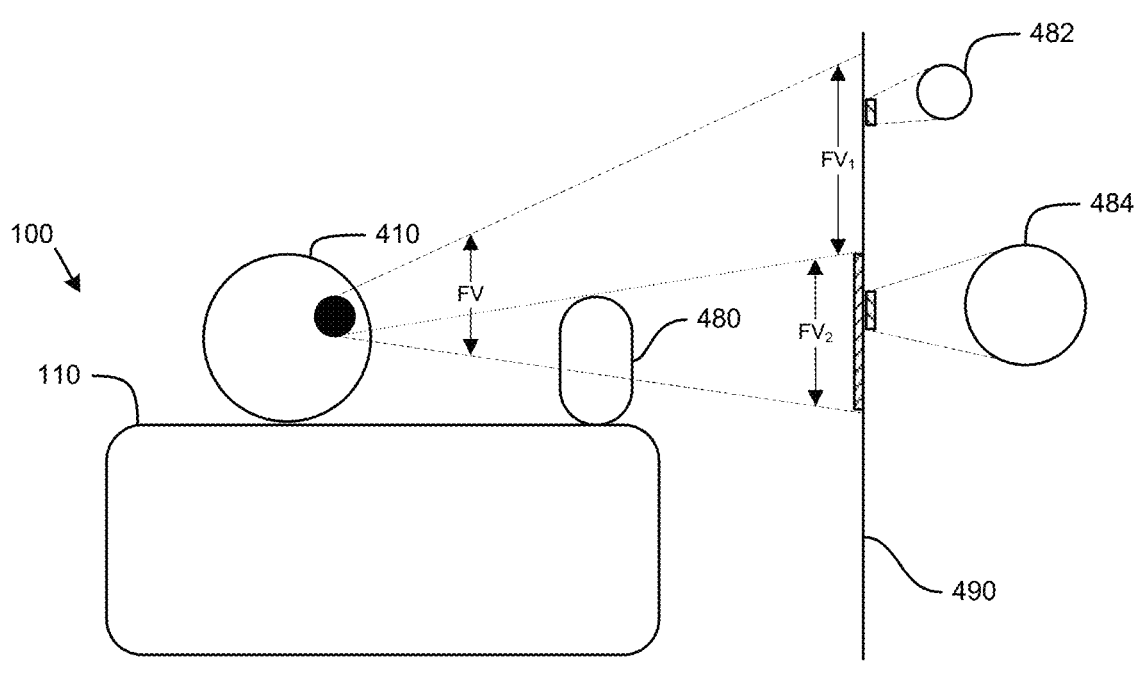
FIG. 4D schematically illustrates a configuration for using a self-occlusion mask in a rendering function of a camera-like sensor, in accordance with some embodiments.
Figure 4E:
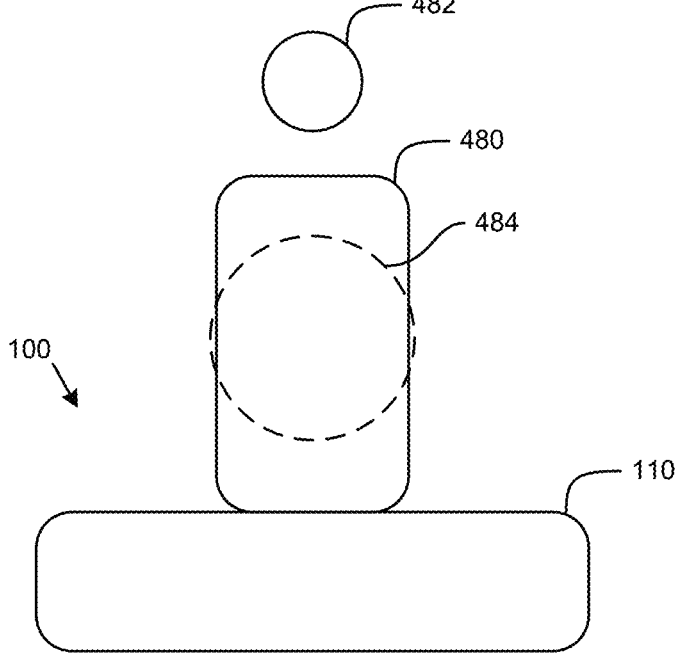
FIG. 4E schematically illustrates the configuration of FIG. 4D from the perspective of the camera-like sensor.

FIG. 4D schematically illustrates how points corresponding to objects in the environment are rejected by the rendering function R for a camera-like sensor using a mask of the robot's body, as described herein. As shown in FIG. 4D, camera 410 coupled to body 110 of a robot 100 has a field of view FV. Due to the presence of occluding component 480 (e.g., a payload portion of robot 100), the field of view FV includes a first portion $FV_1$, which is not occluded by occluding component 480 and a second portion $FV_2$ which is occluded by occluding component 480. Each of $FV_1$ and $FV_2$ may be projected onto an image plane 490 of the camera 410 as shown to form a "mask" with points corresponding to "body" and "no body" as described herein. Points on two objects in the environment 482 and 484 may also be projected onto image plane 490 as shown. As can be observed in FIG. 4D, the projected points from object 482 correspond to points on the image plane within the "no body" portion of the mask, and as such are included in the sensor data to be considered. However, the projected points from object 484 correspond to points on the image plane within the "body" portion of the mask, and are rejected. FIG. 4E is a view of the example shown in FIG. 4D, but from the perspective of the sensor 410 mounted on the body 110 of the robot 100.

Figure 4F:
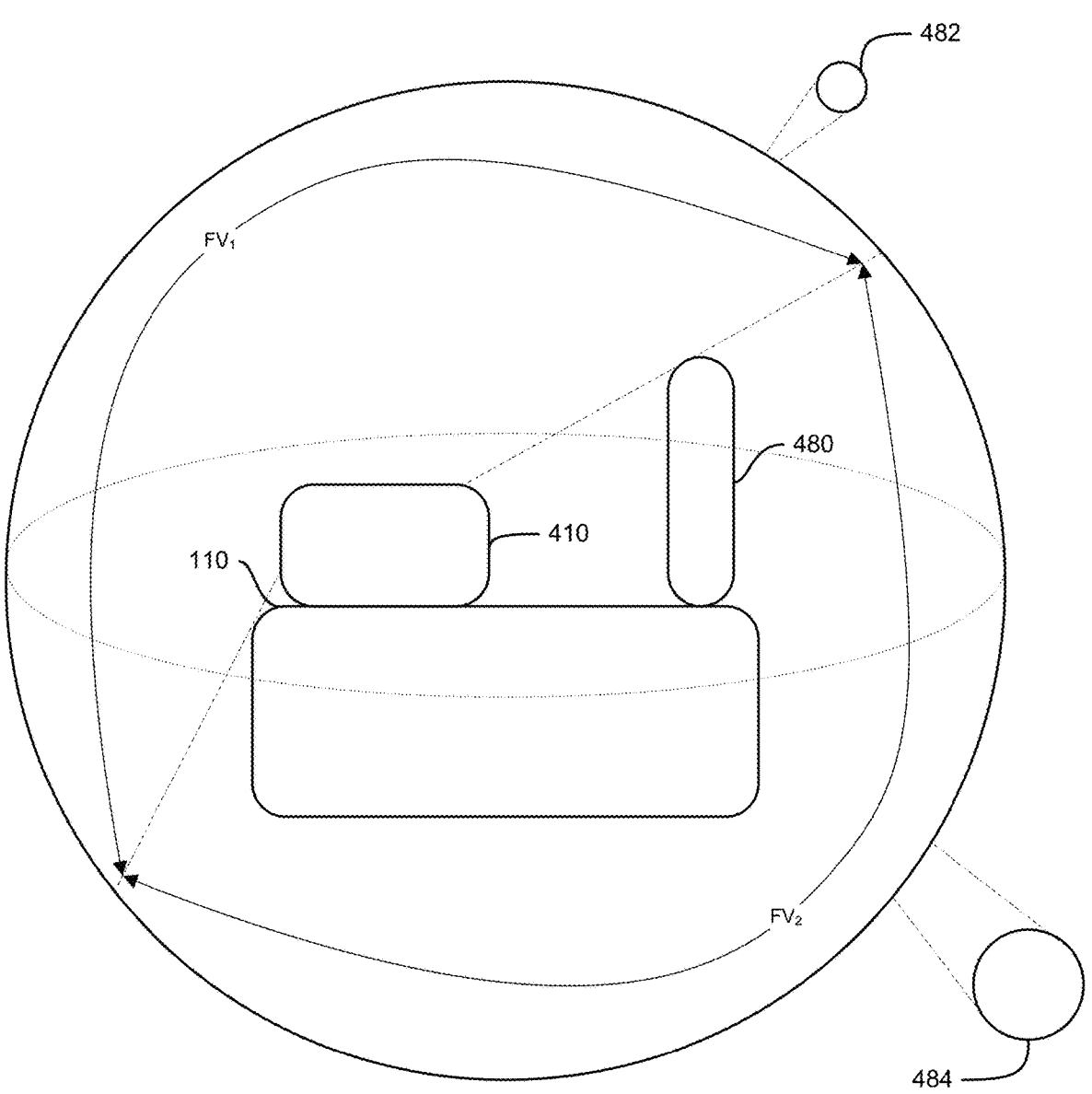
FIG. 4F schematically illustrates a configuration for using a self-occlusion mask in a rendering function of a LIDAR-like sensor, in accordance with some embodiments.

FIG. 4F shows that a LIDAR-like sensor may be modeled as 360-degree spherical camera, with the image plane corresponding to a sphere rather than a rectangle as shown in FIG. 4D for a camera-like sensor. As shown in FIG. 4F, the projection of object 484 onto a spherical image surface of the sensor 410 corresponds to a portion of the 360-degree field of view of the sensor ($FV_2$) that is occluded by the body 110 and occluding component 480 of the robot 100, and as such would be rejected. By contrast, the projection of object 482 onto the spherical image surface of the sensor 410 corresponds to a portion of the 360-degree field of view of the sensor ($FV_1$) that is not occluded by the body 110 and occluding component 480 of the robot 100, and as such would be not be rejected.

In terms of the nomenclature used herein, the rendering function $R(q_r, z_t)$ may be used to determine the sensor data from $z_t$ observable when the robot was in the first configuration $q_r$ (e.g., the configuration of the robot during record time). That is, only the sensor data from $z_t$ observable by the robot at the current time that was also observable when the robot was in the configuration $q_r$ at record time is included in the first overlapping data. Referring to the example in FIG. 3C, the first overlapping data may correspond to the sensor data within region 370 along the wall 340. Referring to the example in FIG. 4B, the first overlapping data may correspond to the sensor data within regions 460 and 480 along the wall 450.

Process 500 then proceeds to act 540, where second overlapping data is determined, the second overlapping data corresponding to first sensor data that overlaps the second sensor data when the robot is in the second configuration. In terms of the nomenclature used herein, the rendering function $R(q_t, z_r)$ may be used to determine the sensor data from $z_r$ that is observable when the robot is in the second configuration $q_t$ (e.g., the configuration of the robot at the current time). That is, only the sensor data from $z_r$ that was observable by the robot at record time that is also observable by the robot in the configuration $q_t$ at the current time is included in the second overlapping data. Referring to the example in FIG. 3C, the second overlapping data may correspond to the sensor data within region 370 along the wall 340. Referring to the example in FIG. 4B, the second overlapping data may correspond to the sensor data within regions 470 and 480 along the wall 450.

Process 500 then proceeds to act 550, where the robot is localized in the environment based on the first overlapping data and the second overlapping data. For instance the portion of the sensor data $z_t$ also observable during record time (when the robot was in the configuration $q_r$) may be matched to the portion of the sensor data $z_r$ stored in the graph map 222 that is also observable at the current time (when the robot is in the configuration $q_t$). In terms of the nomenclature used herein, the sensor data corresponding to $R(q_r, z_t)$ may be aligned to the sensor data corresponding to $R(q_t, z_r)$. Any suitable technique may be used to align the sensor data $R(q_r, z_t)$ and $R(q_t, z_r)$. For instance, in some implementations a point-to-point iterative closest point matching technique may be used to align the sensor data. The aligned sensor data may then be used to localize the robot in the environment.

The inventor has recognized and appreciated that because the exact configuration $q_t$ of the robot with respect to the configuration $q_r$ of the robot is not known, the filtered sensor data (e.g., the first overlapping data and the second overlapping data) used for localization may be overly conservative in some instances. Accordingly, in some embodiments, the sensor data in the rendering set may be expanded (e.g., by 10 cm in each direction and few degrees of angle away from the sensor) so as not to exclude as much sensor data used for localization. In some implementations, the angular field of view of the sensor is expanded by two degrees to include more of the sensor data in the rendering set used for localization.

In the examples described herein, the configurations $q_r$ and $q_t$ specify information about the state of the robot at a particular point in time, which is then used to determine how to interpret sensor data recorded by a sensor of the robot that may have a partially occluded field of view. In some implementations, the configuration q (e.g., $q_r$ or $q_t$) may more generally include information about the state of the environment that may change, such that a configuration at one point in time when considering the robot in its environment is different from a configuration at another point in time. For instance, the state of objects in the environment may be included in the configuration $q_r$ determined at mission record time and stored in a map (e.g., graph map 222) used for localization and/or navigation during mission playback time. Examples of states of objects in the environment that may be included in a configuration q include, but are not limited to, whether a door was open or closed and whether a truck or other vehicle (which may move) was present. As should be appreciated, other aspects of the environment that can change may additionally be represented in the configuration q.

Figure 6:
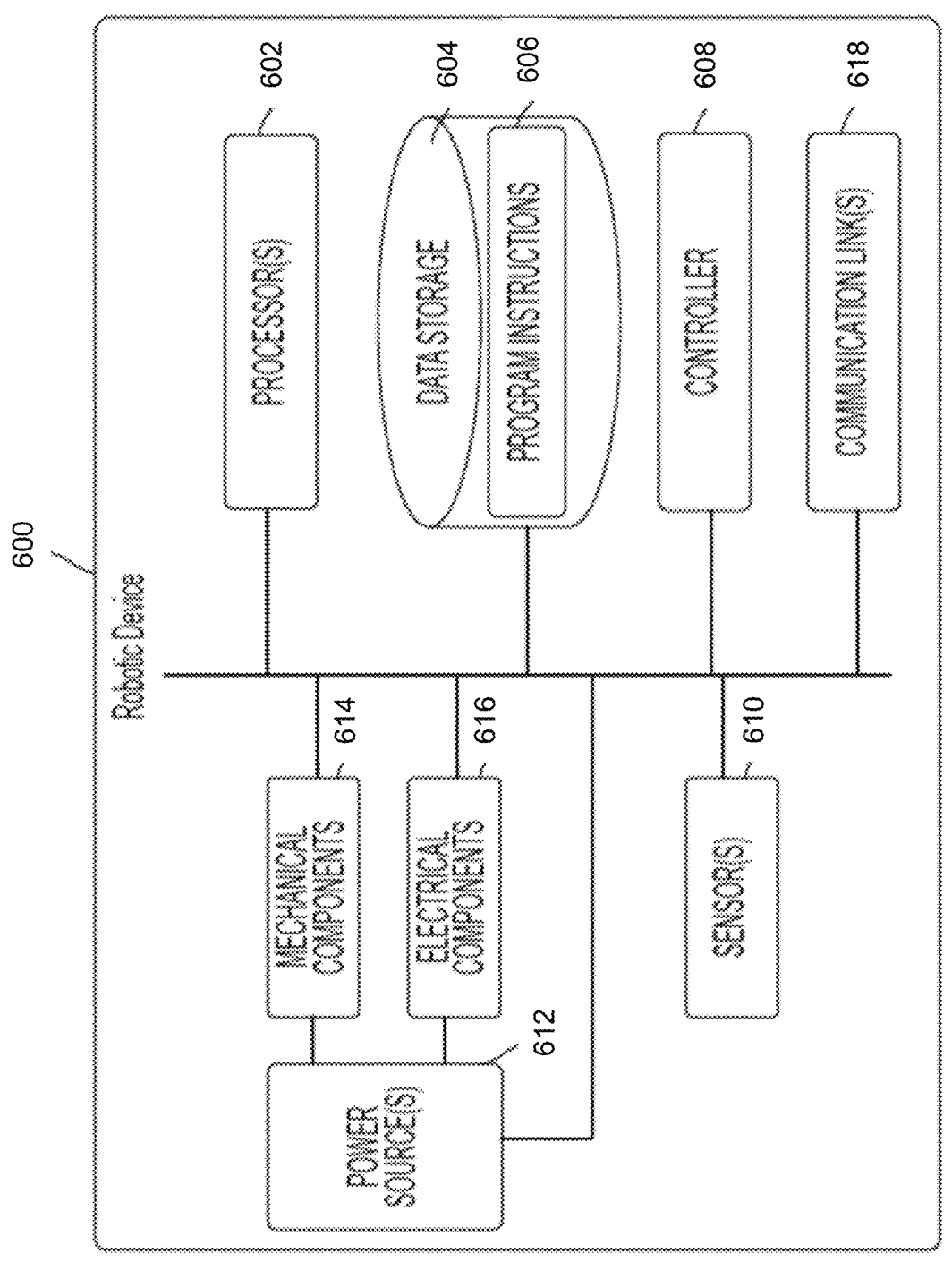
FIG. 6 is a block diagram of components of a robot on which some embodiments of the present disclosure may be implemented.

FIG. 6 illustrates an example configuration of a robotic device (or "robot") 600, according to some embodiments. The robotic device 600 may, for example, correspond to the robot 100 described above. The robotic device 600 represents an illustrative robotic device configured to perform any of the techniques described herein. The robotic device 600 may be configured to operate autonomously, semi-autonomously, and/or using directions provided by user(s), and may exist in various forms, such as a humanoid robot, biped, quadruped, or other mobile robot, among other examples. Furthermore, the robotic device 600 may also be referred to as a robotic system, mobile robot, or robot, among other designations.

As shown in FIG. 6, the robotic device 600 may include processor(s) 602, data storage 604, program instructions 606, controller 608, sensor(s) 610, power source(s) 612, mechanical components 614, and electrical components 616. The robotic device 600 is shown for illustration purposes and may include more or fewer components without departing from the scope of the disclosure herein. The various components of robotic device 600 may be connected in any manner, including via electronic communication means, e.g., wired or wireless connections. Further, in some examples, components of the robotic device 1000 may be positioned on multiple distinct physical entities rather on a single physical entity.

The processor(s) 602 may operate as one or more general-purpose processor or special purpose processors (e.g., digital signal processors, application specific integrated circuits, etc.). The processor(s) 602 may, for example, correspond to the data processing hardware 142 of the robot 100 described above. The processor(s) 602 can be configured to execute computer-readable program instructions 606 that are stored in the data storage 604 and are executable to provide the operations of the robotic device 600 described herein. For instance, the program instructions 606 may be executable to provide operations of controller 608, where the controller 608 may be configured to cause activation and/or deactivation of the mechanical components 614 and the electrical components 616. The processor(s) 602 may operate and enable the robotic device 600 to perform various functions, including the functions described herein.

The data storage 604 may exist as various types of storage media, such as a memory. The data storage 604 may, for example, correspond to the memory hardware 144 of the robot 100 described above. The data storage 604 may include or take the form of one or more non-transitory computer-readable storage media that can be read or accessed by processor(s) 602. The one or more computer-readable storage media can include volatile and/or non-volatile storage components, such as optical, magnetic, organic or other memory or disc storage, which can be integrated in whole or in part with processor(s) 602. In some implementations, the data storage 604 can be implemented using a single physical device (e.g., one optical, magnetic, organic or other memory or disc storage unit), while in other implementations, the data storage 604 can be implemented using two or more physical devices, which may communicate electronically (e.g., via wired or wireless communication). Further, in addition to the computer-readable program instructions 606, the data storage 1004 may include additional data such as diagnostic data, among other possibilities.

The robotic device 600 may include at least one controller 608, which may interface with the robotic device 600 and may be either integral with the robotic device, or separate from the robotic device 600. The controller 608 may serve as a link between portions of the robotic device 600, such as a link between mechanical components 614 and/or electrical components 616. In some instances, the controller 608 may serve as an interface between the robotic device 600 and another computing device. Furthermore, the controller 608 may serve as an interface between the robotic system 600 and a user(s). The controller 608 may include various components for communicating with the robotic device 600, including one or more joysticks or buttons, among other features. The controller 608 may perform other operations for the robotic device 600 as well. Other examples of controllers may exist as well.

Additionally, the robotic device 600 may include one or more sensor(s) 610 such as image sensors, force sensors, proximity sensors, motion sensors, load sensors, position sensors, touch sensors, depth sensors, ultrasonic range sensors, and/or infrared sensors, or combinations thereof, among other possibilities. The sensor(s) 610 may, for example, correspond to the sensors 132 of the robot 100 described above. The sensor(s) 610 may provide sensor data to the processor(s) 602 to allow for appropriate interaction of the robotic system 600 with the environment as well as monitoring of operation of the systems of the robotic device 600. The sensor data may be used in evaluation of various factors for activation and deactivation of mechanical components 614 and electrical components 616 by controller 608 and/or a computing system of the robotic device 600.

The sensor(s) 610 may provide information indicative of the environment of the robotic device for the controller 608 and/or computing system to use to determine operations for the robotic device 600. For example, the sensor(s) 610 may capture data corresponding to the terrain of the environment or location of nearby objects, which may assist with environment recognition and navigation, etc. In an example configuration, the robotic device 600 may include a sensor system that may include a camera, RADAR, LIDAR, time-of-flight camera, global positioning system (GPS) transceiver, and/or other sensors for capturing information of the environment of the robotic device 600. The sensor(s) 610 may monitor the environment in real-time and detect obstacles, elements of the terrain, weather conditions, temperature, and/or other parameters of the environment for the robotic device 600.

Further, the robotic device 600 may include other sensor(s) 610 configured to receive information indicative of the state of the robotic device 600, including sensor(s) 610 that may monitor the state of the various components of the robotic device 600. The sensor(s) 610 may measure activity of systems of the robotic device 600 and receive information based on the operation of the various features of the robotic device 600, such as the operation of extendable legs, arms, or other mechanical and/or electrical features of the robotic device 600. The sensor data provided by the sensors may enable the computing system of the robotic device 600 to determine errors in operation as well as monitor overall functioning of components of the robotic device 600.

For example, the computing system may use sensor data to determine the stability of the robotic device 600 during operations as well as measurements related to power levels, communication activities, components that require repair, among other information. As an example configuration, the robotic device 600 may include gyroscope(s), accelerometer(s), and/or other possible sensors to provide sensor data relating to the state of operation of the robotic device. Further, sensor(s) 610 may also monitor the current state of a function, such as a gait, that the robotic system 600 may currently be operating. Additionally, the sensor(s) 610 may measure a distance between a given robotic leg of a robotic device and a center of mass of the robotic device. Other example uses for the sensor(s) 610 may exist as well.

Additionally, the robotic device 600 may also include one or more power source(s) 612 configured to supply power to various components of the robotic device 600. Among possible power systems, the robotic device 600 may include a hydraulic system, electrical system, batteries, and/or other types of power systems. As an example illustration, the robotic device 600 may include one or more batteries configured to provide power to components via a wired and/or wireless connection. Within examples, components of the mechanical components 614 and electrical components 616 may each connect to a different power source or may be powered by the same power source. Components of the robotic system 600 may connect to multiple power sources as well.

Within example configurations, any suitable type of power source may be used to power the robotic device 600, such as a gasoline and/or electric engine. Further, the power source(s) 612 may charge using various types of charging, such as wired connections to an outside power source, wireless charging, combustion, or other examples. Other configurations may also be possible. Additionally, the robotic device 600 may include a hydraulic system configured to provide power to the mechanical components 614 using fluid power. Components of the robotic device 600 may operate based on hydraulic fluid being transmitted throughout the hydraulic system to various hydraulic motors and hydraulic cylinders, for example. The hydraulic system of the robotic device 600 may transfer a large amount of power through small tubes, flexible hoses, or other links between components of the robotic device 600. Other power sources may be included within the robotic device 600.

Mechanical components 614 can represent hardware of the robotic system 600 that may enable the robotic device 600 to operate and perform physical functions. As a few examples, the robotic device 600 may include actuator(s), extendable leg(s) ("legs"), arm(s), wheel(s), one or multiple structured bodies for housing the computing system or other components, and/or other mechanical components. The mechanical components 614 may depend on the design of the robotic device 600 and may also be based on the functions and/or tasks the robotic device 600 may be configured to perform. As such, depending on the operation and functions of the robotic device 600, different mechanical components 614 may be available for the robotic device 600 to utilize. In some examples, the robotic device 600 may be configured to add and/or remove mechanical components 614, which may involve assistance from a user and/or other robotic device. For example, the robotic device 600 may be initially configured with four legs, but may be altered by a user or the robotic device 600 to remove two of the four legs to operate as a biped. Other examples of mechanical components 614 may be included.

The electrical components 616 may include various components capable of processing, transferring, providing electrical charge or electric signals, for example. Among possible examples, the electrical components 616 may include electrical wires, circuitry, and/or wireless communication transmitters and receivers to enable operations of the robotic device 600. The electrical components 616 may interwork with the mechanical components 614 to enable the robotic device 600 to perform various operations. The electrical components 616 may be configured to provide power from the power source(s) 612 to the various mechanical components 614, for example. Further, the robotic device 600 may include electric motors. Other examples of electrical components 616 may exist as well.

In some implementations, the robotic device 600 may also include communication link(s) 618 configured to send and/or receive information. The communication link(s) 618 may transmit data indicating the state of the various components of the robotic device 600. For example, information read in by sensor(s) 610 may be transmitted via the communication link(s) 618 to a separate device. Other diagnostic information indicating the integrity or health of the power source(s) 612, mechanical components 614, electrical components 618, processor(s) 602, data storage 604, and/or controller 608 may be transmitted via the communication link(s) 618 to an external communication device.

In some implementations, the robotic device 600 may receive information at the communication link(s) 618 that is processed by the processor(s) 602. The received information may indicate data that is accessible by the processor(s) 602 during execution of the program instructions 606, for example. Further, the received information may change aspects of the controller 608 that may affect the behavior of the mechanical components 614 or the electrical components 616. In some cases, the received information indicates a query requesting a particular piece of information (e.g., the operational state of one or more of the components of the robotic device 600), and the processor(s) 602 may subsequently transmit that particular piece of information back out the communication link(s) 618.

In some cases, the communication link(s) 618 include a wired connection. The robotic device 600 may include one or more ports to interface the communication link(s) 618 to an external device. The communication link(s) 618 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, radio, Bluetooth, or a near-field communication (NFC) device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-described functions. The one or more controllers can be implemented in numerous ways, such as with dedicated hardware or with one or more processors programmed using microcode or software to perform the functions recited above.

Various aspects of the present technology may be used alone, in combination, or in a variety of arrangements not specifically described in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, some embodiments may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments in detail, various modifications and improvements will readily occur to those skilled in the art. Such modifications and improvements are intended to be within the spirit and scope of the technology. Accordingly, the foregoing description is by way of example only, and is not intended as limiting.

What is claimed is:

1. A method for localizing a robot in an environment, the method comprising:
    determining, for a first configuration of the robot at a first time, first sensor data that is not occluded by a portion of the robot;
    determining, for a second configuration of the robot at a second time, second sensor data that is not occluded by the portion of the robot, wherein a combination of the first time and the second time comprises a third time associated with recordation of a mission and a fourth time associated with playback of the mission;
    determining first overlapping data corresponding to a first at least a portion of the second sensor data that overlaps a first at least a portion of the first sensor data when the robot is in the first configuration; and
    instructing localization of the robot in the environment based on the first overlapping data.

2. The method of claim 1, further comprising:
    determining second overlapping data corresponding to a second at least a portion of the first sensor data that overlaps a second at least a portion of the second sensor data when the robot is in the second configuration, wherein instructing the localization of the robot is further based on the second overlapping data.

3. The method of claim 1, wherein the robot comprises a payload coupled to a body of the robot, and wherein determining the first sensor data comprises determining the first sensor data is not occluded by the payload.

4. The method of claim 3, further comprising:
    modeling the payload as a geometric shape coupled to the body, wherein determining the first sensor data further comprises determining the first sensor data is not occluded by the geometric shape.

5. The method of claim 3, wherein the first sensor data and the second sensor data comprise LIDAR data captured by at least one LIDAR sensor, and wherein the at least one LIDAR sensor and the payload are coupled to a same surface of the body.

6. The method of claim 1, wherein the robot comprises an arm, and wherein determining the first sensor data comprises determining the first sensor data is not occluded by the arm.

7. The method of claim 1, wherein the first configuration is associated with one or more parameters describing a state of the robot at the first time.

8. The method of claim 7, wherein the one or more parameters indicate one or more of a position of the robot, an orientation of the robot, a joint angle of the robot, or a payload of the robot.

9. The method of claim 1, wherein the first sensor data and the second sensor data comprise LIDAR data captured by at least one LIDAR sensor, and wherein the at least one LIDAR sensor is coupled to a body of the robot.

10. The method of claim 9, wherein the at least one LIDAR sensor comprises a scanning LIDAR sensor, wherein the first sensor data and the second sensor data indicate a 360° view of the environment.

11. The method of claim 1, wherein determining the first sensor data comprises:
    receiving map data indicating a map of the environment and the first configuration; and
    determining the first sensor data based on the map data.

12. The method of claim 11, wherein the map data indicates a position of a payload coupled to a body of the robot.

13. The method of claim 1, wherein determining the first sensor data comprises:
    receiving map data that indicates a map of the environment and the first sensor data.

14. The method of claim 1, wherein determining the first overlapping data comprises:
    rendering the second sensor data to correspond to the first configuration.

15. The method of claim 14, wherein determining the first overlapping data further comprises:
    filtering the second sensor data based on rendering the second sensor data to correspond to the first configuration.

16. The method of claim 2, wherein instructing the localization of the robot comprises:

instructing the localization of the robot based on matching the first overlapping data to the second overlapping data.

17. A mobile robot, comprising:
a body;
one or more locomotion-based structures coupled to the body;
a sensor coupled to the body;
at least one storage device storing instructions; and
at least one computer processor, based on execution of the instructions, configured to:
    determine, for a first configuration of the mobile robot at a first time, first sensor data, obtained from the sensor, that is not occluded by a portion of the mobile robot;
    determine, for a second configuration of the mobile robot at a second time, second sensor data, obtained from the sensor, that is not occluded by the portion of the mobile robot, wherein a combination of the first time and the second time comprises a third time associated with recordation of a mission and a fourth time associated with playback of the mission;
    determine first overlapping data corresponding to at least a portion of the second sensor data that overlaps at least a portion of the first sensor data when the mobile robot is in the first configuration; and
    instruct localization of the mobile robot in an environment based on the first overlapping data.

18. A non-transitory computer readable medium encoded with a plurality of instructions, wherein, based on execution of the plurality of instructions at least one computer processor is configured to:
    determine, for a first configuration of a robot at a first time, first sensor data that is not occluded by a portion of the robot;
    determine, for a second configuration of the robot at a second time, second sensor data that is not occluded by the portion of the robot, wherein a combination of the first time and the second time comprises a third time associated with recordation of a mission and a fourth time associated with playback of the mission;
    determine first overlapping data corresponding to at least a portion of the second sensor data that overlaps at least a portion of the first sensor data when the robot is in the first configuration; and
    instruct localization of the robot in an environment based on the first overlapping data.

19. A method for localizing a robot in an environment, the method comprising:
    determining, for a first configuration of the robot at a first time, first sensor data that is not occluded by a portion of the robot;

determining, for a second configuration of the robot at a second time, second sensor data that is not occluded by the portion of the robot, wherein the portion of the robot comprises a payload of the robot or an arm of the robot;
    determining first overlapping data corresponding to at least a portion of the second sensor data that overlaps at least a portion of the first sensor data when the robot is in the first configuration; and
    instructing localization of the robot in the environment based on the first overlapping data.

20. A mobile robot, comprising:
a body;
one or more locomotion-based structures coupled to the body;
at least one storage device storing instructions; and
at least one computer processor, based on execution of the instructions, configured to:
    determine, for a first configuration of the mobile robot at a first time, first sensor data that is not occluded by a portion of the mobile robot;
    determine, for a second configuration of the mobile robot at a second time, second sensor data that is not occluded by the portion of the mobile robot, wherein the portion of the mobile robot comprises a payload of the mobile robot or an arm of the mobile robot;
    determine first overlapping data corresponding to at least a portion of the second sensor data that overlaps at least a portion of the first sensor data when the mobile robot is in the first configuration; and
    instruct localization of the mobile robot in an environment based on the first overlapping data.

21. A non-transitory computer readable medium encoded with a plurality of instructions, wherein, based on execution of the plurality of instructions, at least one computer processor is configured to:
    determine, for a first configuration of a robot at a first time, first sensor data that is not occluded by a portion of the robot;
    determine, for a second configuration of the robot at a second time, second sensor data that is not occluded by the portion of the robot, wherein the portion of the robot comprises a payload of the robot or an arm of the robot;
    determine first overlapping data corresponding to at least a portion of the second sensor data that overlaps at least a portion of the first sensor data when the robot is in the first configuration; and
    instruct localization of the robot in an environment based on the first overlapping data.

* * * * *